United States Patent
Seo et al.

(10) Patent No.: US 11,323,638 B2
(45) Date of Patent: May 3, 2022

(54) METHOD OF CORRECTING DYNAMIC VISION SENSOR (DVS) EVENTS AND IMAGE SENSOR PERFORMING THE SAME

(71) Applicant: SAMSUNG ELECTRONICS CO., LTD., Suwon-si (KR)

(72) Inventors: Jongseok Seo, Seoul (KR); Junseok Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 218 days.

(21) Appl. No.: 16/796,401

(22) Filed: Feb. 20, 2020

(65) Prior Publication Data
US 2021/0014435 A1    Jan. 14, 2021

(30) Foreign Application Priority Data
Jul. 8, 2019    (KR) ................. 10-2019-0081962

(51) Int. Cl.
*H04N 5/341*    (2011.01)
*H04N 5/345*    (2011.01)
*G06T 7/13*    (2017.01)
*G06T 7/136*    (2017.01)
*H04N 5/378*    (2011.01)

(52) U.S. Cl.
CPC ............. *H04N 5/341* (2013.01); *G06T 7/13* (2017.01); *G06T 7/136* (2017.01); *H04N 5/3454* (2013.01); *H04N 5/378* (2013.01)

(58) Field of Classification Search
CPC ........ H04N 5/142; H04N 5/144; H04N 5/341; H04N 5/3454; H04N 5/3456; H04N 5/369; H04N 5/378; H04N 5/379; H04N 9/04551; H01L 27/14601; G06T 7/13; G06T 7/136; G06T 2207/10024
See application file for complete search history.

(56) References Cited

U.S. PATENT DOCUMENTS

| | | | |
|---|---|---|---|
| 8,520,970 B2 * | 8/2013 | Strandemar | G06K 9/6289 382/263 |
| 9,001,220 B2 * | 4/2015 | Kim | H04N 5/343 348/208.14 |
| 2014/0125994 A1 | 5/2014 | Kim et al. | |
| 2018/0098082 A1 * | 4/2018 | Burns | H04N 19/117 |
| 2018/0191972 A1 | 7/2018 | Berner et al. | |

(Continued)

FOREIGN PATENT DOCUMENTS

JP    2006-279897    10/2006

*Primary Examiner* — Lin Ye
*Assistant Examiner* — Chriss S Yoder, III
(74) *Attorney, Agent, or Firm* — F. Chau & Associates, LLC

(57) ABSTRACT

A method of correcting dynamic vision sensor (DVS) events is described. The method generates event data including events representing motion information of an object included in an image. Additionally, the method generates image data capturing an image and generates edge data representing edge information of the image based on the image data. The method also generates omitted events of the event data based on the edge data. Accuracy of the event data and performance of machine vision devices and systems operating based on the event data are enhanced by supplementing the omitted events of the event data provided from the DVS, using the edge information.

20 Claims, 27 Drawing Sheets

(56) References Cited

U.S. PATENT DOCUMENTS

| | | |
|---|---|---|
| 2018/0262705 A1 | 9/2018 | Park et al. |
| 2018/0308253 A1 | 10/2018 | Ryu et al. |
| 2021/0174092 A1* | 6/2021 | Zhao .......................... G06T 7/20 |

* cited by examiner

FIG. 13

FIG. 19
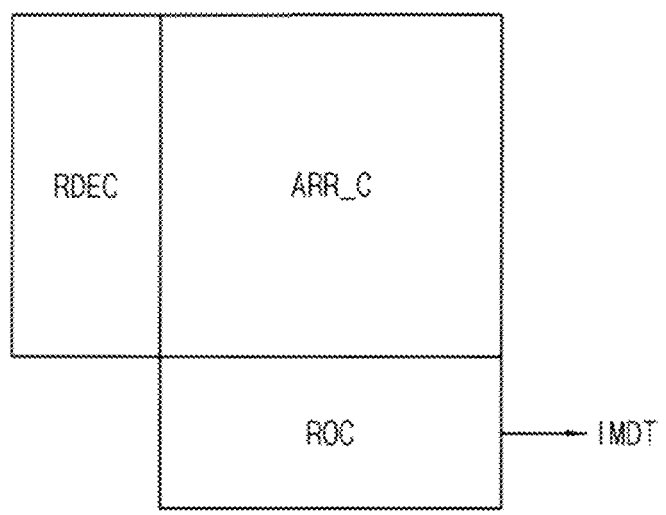
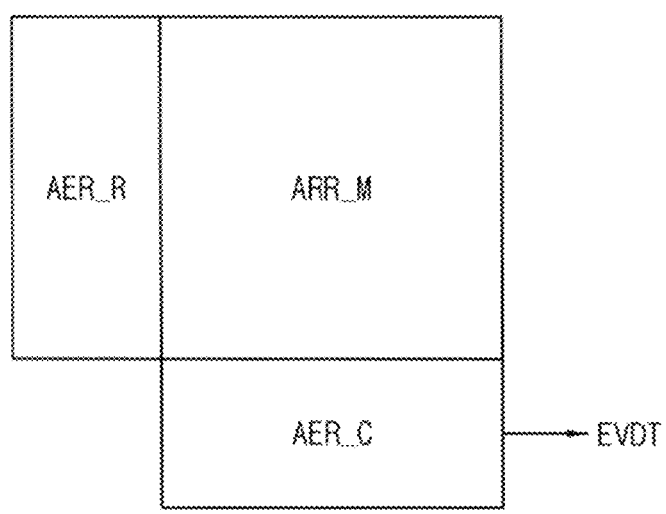

| SBFR11 | SBFR12 | SBFR13 | SBFR14 |
|---|---|---|---|
| SBFR21 | SBFR22 | SBFR23 | SBFR24 |
| SBFR31 | SBFR32 | SBFR33 | SBFR34 |

FRAME

METHOD OF CORRECTING DYNAMIC VISION SENSOR (DVS) EVENTS AND IMAGE SENSOR PERFORMING THE SAME

CROSS-REFERENCE TO RELATED APPLICATION

This application claims priority under 35 USC § 119 to Korean Patent Application No. 10-2019-0081962, filed on Jul. 8, 2019, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a method of correcting events of a dynamic vision sensor (DVS) and an image sensor performing the method.

2. Discussion of the Related Art

Image sensors detect visual information to create an image. A multitude of applications use image sensors, such as smart phones, tablet computers, and cameras. Frame-based image sensors are used for machine tasks, such as object recognition. Frame-based image sensors often create redundant and unusable data for motion imaging tasks due to the use of still-image sequencing to create motion.

A dynamic vision sensor (DVS) reduces data usage by pre-processing visual information for multiple pixels, rather than capturing multiple still images. The DVS provides pixel-level changes in light intensity, called event data, to an imaging system.

A DVS provides event data, such as the horizontal and vertical coordinates of an event on an image plane, the polarity of the event, and the timestamp of the event. Occasionally, event data is omitted from an event dataset, which can cause a malfunction of an imaging system. Therefore, there is a need in the art for a method of efficiently capturing motion data while compensating for omitted events.

SUMMARY

Some example embodiments may provide a method of correcting events to enhance accuracy of event data provided from a dynamic vision sensor (DVS).

Some example embodiments may provide an image sensor of performing the method of correcting the events of the DVS.

According to example embodiments, a method of correcting DVS events includes, generating, using DVS pixels, event data including events representing motion information of an object included in an image, generating, using image pixels, image data capturing the image, generating edge data representing edge information of the image based on the image data, and generating omitted events of the event data based on the edge data.

According to example embodiments, an image sensor includes DVS pixels, image pixels and a DVS event compensation circuit. The DVS pixels generate event data including events representing motion information of an object included in an image. The image pixels generate image data capturing the image. The DVS event compensation circuit generates edge data representing edge information of the image based on the image data and generates omitted events of the event data based on the edge data.

According to example embodiments, a method of correcting DVS events includes sensing event data representing changes in an image; sensing image data of the image; generating edge data representing edge information of the image based on the image data, wherein each pixel of the edge data corresponds to a pixel of the event data; obtaining a line sum value by summing values of the edge data multiplied by values of the event data in one pixel direction relative to a target pixel; comparing the line sum value with a reference value; and generating an omitted event based on the comparison.

The described systems and methods, according to example embodiments, may enhance accuracy of the event data and performance of machine vision devices and systems operating based on the event data, by supplementing the omitted events of the event data provided from the DVS, using the edge information.

BRIEF DESCRIPTION OF THE DRAWINGS

Example embodiments of the present disclosure will be more clearly understood from the following detailed description taken in conjunction with the accompanying drawings.

FIG. 13 is a diagram illustrating an example embodiment of a layout of a pixel array included in an image sensor according to example embodiments.

FIG. 19 is a block diagram illustrating an image sensor according to example embodiments.

FIGS. 20 and 21 are diagrams illustrating example embodiments of a layout of a pixel array included in an image sensor according to example embodiments.

FIGS. 25 and 26 are diagrams for describing an operation of a mode controller included in the DVS event compensation circuit of FIG. 24.

DETAILED DESCRIPTION OF THE EMBODIMENTS

Figure 1:
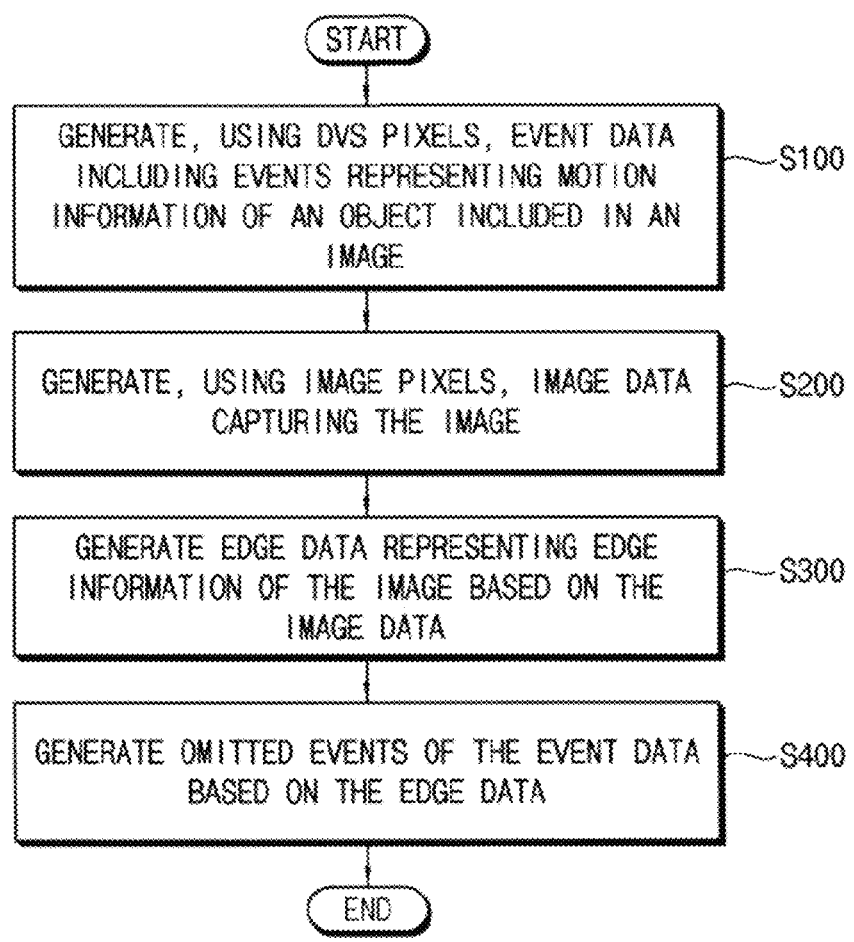
FIG. 1 is a flow chart illustrating a method of correcting DVS events according to example embodiments.

The present disclosure relates to a dynamic vision sensor (DVS) and a method of correcting DVS events by supplementing omitted events of event data provided from an DVS. The accuracy of event data may be enhanced by supplementing the event data with omitted events, which may improve the performance of devices and systems operating based on the enhanced event data. Embodiments of the present disclosure may be applied to improve the performance of a variety of systems including video capturing devices and simultaneous localization and mapping (SLAM) systems.

Embodiments of the present disclosure generate edge data representing edge information of an image based on the image data, and generate the omitted events based on the edge data. In some cases, the event data is adjusted to ensure that each pixel of the edge data corresponds to a pixel of the event data. Embodiments of the present disclosure synchronize edge data and the event data to spatially, temporally, or both. In some cases, the DVS event compensation may be performed selectively.

Various example embodiments will be described more fully hereinafter with reference to the accompanying drawings, in which some example embodiments are shown. In the drawings, like numerals refer to like elements throughout. The repeated descriptions may be omitted.

FIG. 1 is a flow chart illustrating a method of correcting DVS events according to example embodiments.

Referring to FIG. 1, event data including events representing motion information of an object included in an image is generated using DVS pixels (S100). The generation of the event data using the DVS pixels will be described below with reference to FIGS. 11 and 12.

Image data capturing the image is generated using image pixels (S200). In some example embodiments, the image data (e.g., color pixel values) may be generated using the image pixels including color pixels corresponding to different colors. The generation of the image data using the image pixels will be described below with reference to FIGS. 10A through 10D.

Edge data representing edge information of the image is generated by the image data (S300). Omitted events of the event data are generated by the edge data (S400).

Each pixel of the edge data may correspond to a pixel of the event data. For the one-to-one corresponding, resolution conversion, temporal synchronization and/or spatial synchronization may be performed between the edge data and the event data.

When pixels of the edge data corresponds to pixels the event data, a determination as to whether to generate the omitted event may be based on a line sum value that may be obtained by summing multiplied values of the edge data and the event data by units of pixels, as will be described below with reference to FIGS. 7 and 8.

As such, the method of correcting the events of the DVS, according to example embodiments, may enhance accuracy of event data and performance of machine vision devices and systems operating based on the event data. Correcting the events of the DVS may be performed by supplementing, or compensating for, the omitted events of the event data provided from the DVS, using edge information of a subject of an image.

Figure 2:
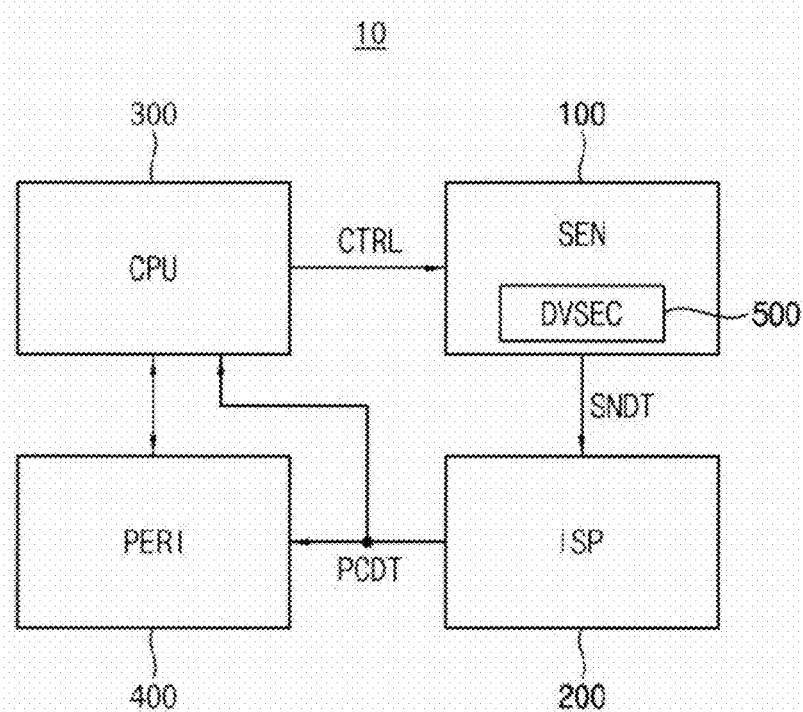
FIG. 2 is a block diagram illustrating an image processing system according to example embodiments.

FIG. 2 is a block diagram illustrating an image processing system according to example embodiments.

Referring to FIG. 2, an image processing system 10 may include an image sensor 100, an image signal processor 200, a processor 300 and a peripheral circuit 400. The image processing system 10 may be implemented as a system-on-chip (SoC).

The image sensor 100 may perform a function of an image sensor to generate image data capturing an image using image pixels. Additionally, the image sensor 100 may also perform a function of a dynamic vision sensor (DVS). The combination of the function of an image sensor and a DVS may of the image sensor 100 may provide event data, including events representing motion information of an object included in the image using DVS pixels.

In some example embodiments, each DVS pixel may include a signal storage element (e.g., a capacitor). The DVS pixel may detect voltage changes of the signal storage element to generate the event data including the events. In some example embodiments, the image pixels may be color pixels corresponding to different colors and the image data may be color image data.

The image sensor 100 may provide sensing data SNDT, in digital form, to the image signal processor 200. The sensing data SNDT may include color image data output from the image data and/or the event data output from the DVS pixels. The overall operations of the image sensor 100 may be controlled by control signals CTRL provided from the processor 300. The processor 300 may be a general-purpose processor such as a central processing unit (CPU).

According to example embodiments, the image sensor 100 may further include at least one depth sensor to provide depth image data in addition to the color image data. The image sensor 100 may be implemented as a separate chip. The image sensor 100 may be a complementary metal-oxide semiconductor (CMOS) image sensor.

The image sensor 100 may include a DVS event compensation circuit 500 according to example embodiments. The DVS event compensation circuit 500 may generate edge data representing edge information of the image based on the image data and generate omitted events of the event data based on the edge data. The DVS event compensation circuit

500 may provide compensated event data by combining the events included in original event data and the omitted events generated in the DVS event compensation circuit 500.

The image signal processor 200 may receive the sensing data SNDT including the image data and the compensated event data and process the sensing data SNDT to provide processed data PCDT. For example, the image signal processor 200 may process the sensing data SNDT frame by frame. The sensing data SNDT may be processed frame by frame. The image signal processor 200 may include a frame memory to store the sensing data SNDT and/or the processed data PCDT. The image signal processor 200 may also adjust brightness, contrast, and color saturation of the image data included in the sensing data SNDT. Although the image signal processor 200 is implemented outside the image sensor 100 in the embodiments illustrated in FIG. 2, example embodiments are not restricted. According to example embodiments, the image signal processor 200 may be implemented inside the image sensor 100.

The processor 300 may receive the processed data PCDT from the image signal processor 200 and perform various functions by comparing the processed data PCDT with image codes or motion codes that are stored in advance. For example, the image code may be a two-dimensional image, a three-dimensional (3D) image, and a motion code. The two-dimensional image may be a person's fingerprint or face. The three-dimensional (3D) image may include depth or spatial information. The motion code may be a reference motion of an image corresponding to a continuous motion such as a hand gesture.

In some example embodiments, the processor 300 may perform a machine vision function based on the processed data PCDT. For example, when the motion code is a motion image of a finger drawing a circle, the processor 300 may determine whether the processed data PCDT corresponds to the motion image of a finger drawing a circle. The processor 300 may then perform the machine vision function according to the determined result. The processor 300 may activate a system connected to the image processing system 10, such as a power system, an audio system, a specific application, and so on, based on the comparison result of the processed data PCDT and the stored motion codes.

The peripheral circuit 400 may provide signals or data to the processor 300. The signals or data are generated based on the system status and/or various inputs. The peripheral circuit 400 may be implemented as an input/output (I/O) interface. In this case, the peripheral circuit 400 may transmit a signal generated according to a user's input to the processor 300. The I/O interface may be any type of I/O device, such as an external input button, a touch screen, or a mouse. The peripheral circuit 400 may include a display device or an interface to be connected to an external display device. The display device may the image based on the processed image data PCDT.

Figure 3:
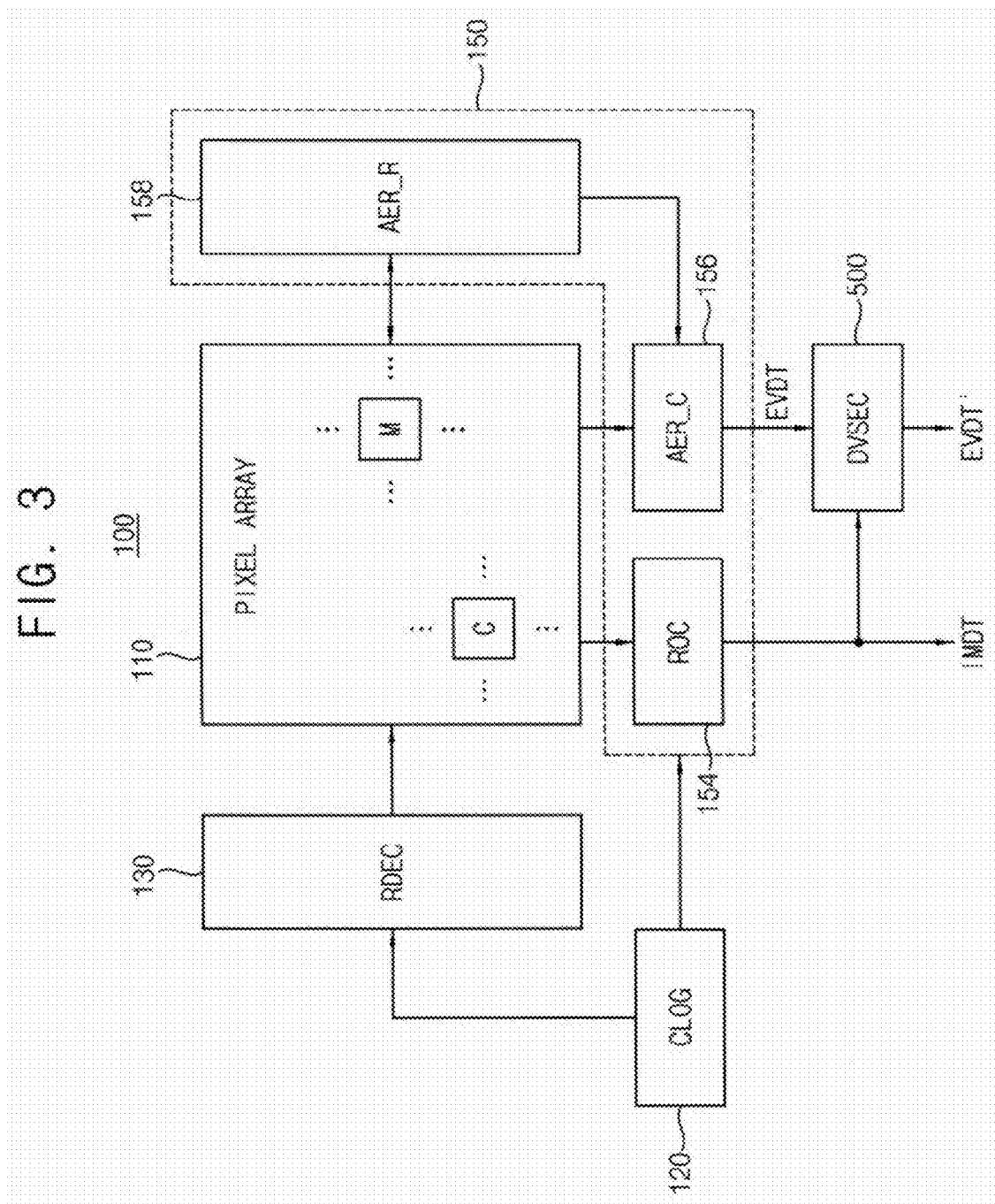
FIG. 3 is a block diagram illustrating an image sensor according to example embodiments.

FIG. 3 is a block diagram illustrating an image sensor according to example embodiments.

Referring to FIG. 3, an image sensor 100 may include a pixel array 110, a control logic (or a control circuit) 120, a row driver 130, a pixel signal processing circuit 150, and a DVS event compensation circuit 500.

The pixel array 110 includes a plurality of color pixels C obtaining color image data of an object and a plurality of DVS pixels M sensing the motion of the object. The pixel array 110 may also include a color filter array (not shown), which includes a plurality of color filter layers (not shown) transmitting light with a predetermined wavelength.

The pixel array 110 may also include depth sensor pixels (not shown) obtaining depth information of the object. When a pixel signal of the depth sensor pixel is processed using a time-of-flight (TOF) scheme, the image sensor 100 may also include an infrared pass filter (not shown). The infrared pass filter filters light other than infrared light emitted by an infrared light source (not shown) controlled by the control logic 120, and infrared light reflected from an object after being emitted by the infrared light source.

The control logic 120 may control the overall operation of the image sensor 100 based on the control signal CTRL from the image signal processor 200 in FIG. 2. The control logic 120 may control the row driver 130 and the pixel signal processing circuit 150.

The row driver 130 may enable the color pixels C and the DVS pixels M by rows according to the control of the control logic 120.

The pixel signal processing circuit 150 may process pixel signals from the pixel array 110 to output the sensing data SNDT. The sensing data SNDT may include image data IMDT and event data EVDT. The pixel signal processing circuit 150 may include a readout circuit 154, a column AER (address event representation) AER_C 156, and a row AER AER_R 158.

Each of the DVS pixels M included in the pixel array 110 may output an event signal according to a change in the quantity of light. The event signal will be described below with reference to FIGS. 11 and 12. The column AER 156 may receive the event signal and, based on the event signal, output a column address value of each DVS pixel M which has generated the event signal.

The readout circuit 154 may receive a pixel signal output from each of the color pixels C included in the pixel array 110 and process the pixel signal to output the image data IMDT. According to an example embodiments, the readout circuit 154 may include a column decoder (not shown), a column driver (not shown), a correlated double sampling (CDS) block (not shown), an analog-to-digital converter (ADC) block (not shown), an output buffer (not shown), and the like.

The row AER 158 may receive the event signal output from each DVS pixel M and output a row address value of each DVS pixel M which has generated the event signal. Output a row address value of each DVS pixel M may be based on the event signal. The row address value may be transmitted to the column AER 156. The column AER 156 may generate the event data EVDT including the events.

The DVS event compensation circuit 500 may generate edge data representing edge information of the image based on the image data IMDT and generate omitted events of the event data based on the edge data. The DVS event compensation circuit 500 may provide compensated event data EVDT' by combining the events included in the original event data EVDT and the omitted events generated in the DVS event compensation circuit 500.

As such, the method of correcting the events of the DVS and the image sensor, according to example embodiments, may enhance accuracy of the event data and performance of machine vision devices and systems operating based on the event data. Correcting the events of the DVS may be performed by supplementing the omitted events of the event data provided from the DVS, using the edge information of a subject of an image.

Figure 4:
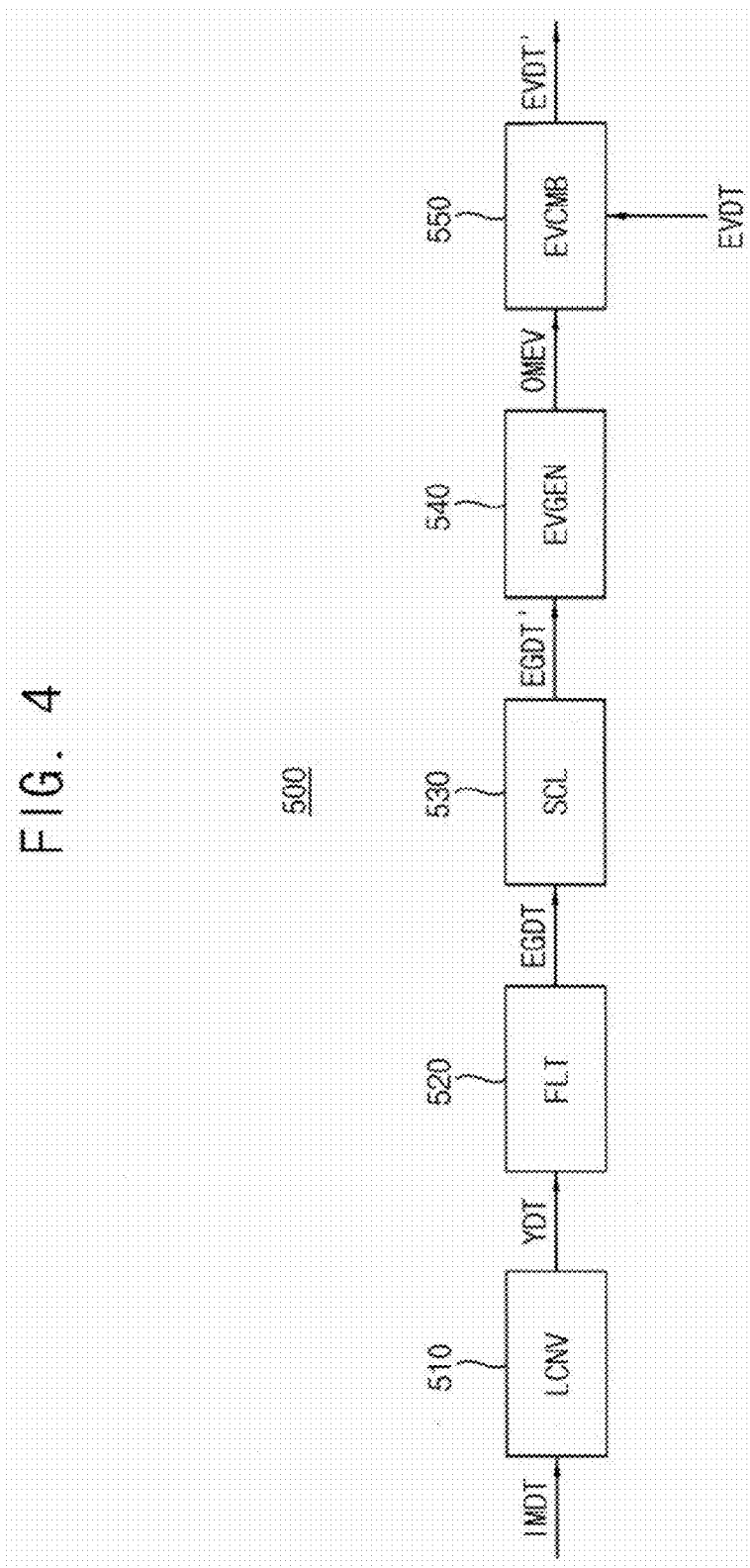
FIG. 4 is a block diagram illustrating a DVS event compensation circuit according to example embodiments.
Figure 5:
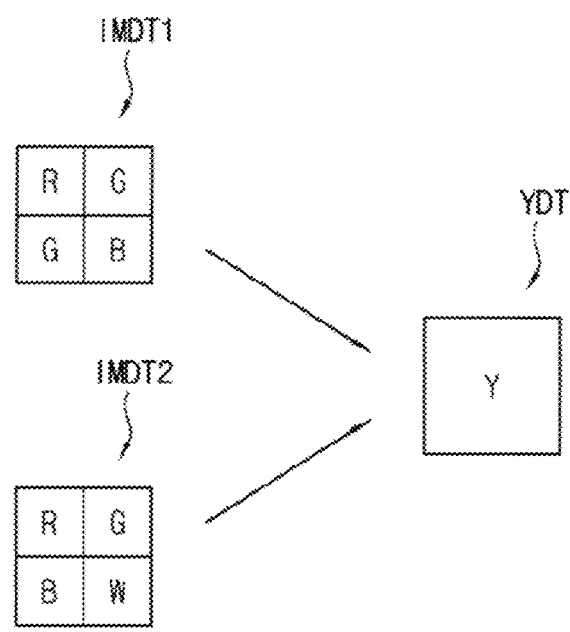
FIG. 5 is a diagram for describing an operation of a luminance converter included in the DVS event compensation circuit of FIG. 4.
Figure 6A:
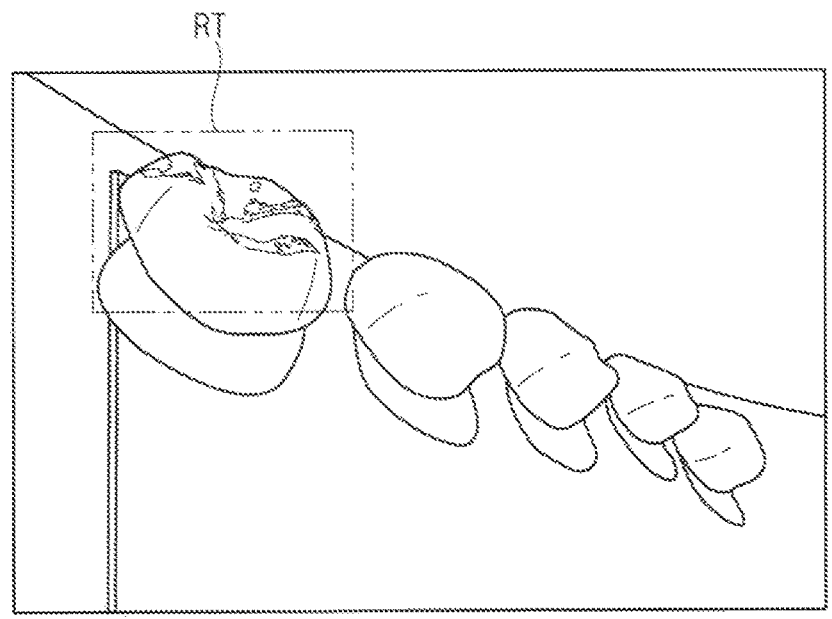
FIGS. 6A and 6B are diagrams for describing an operation of a filter included in the DVS event compensation circuit of FIG. 4.
Figure 6B:
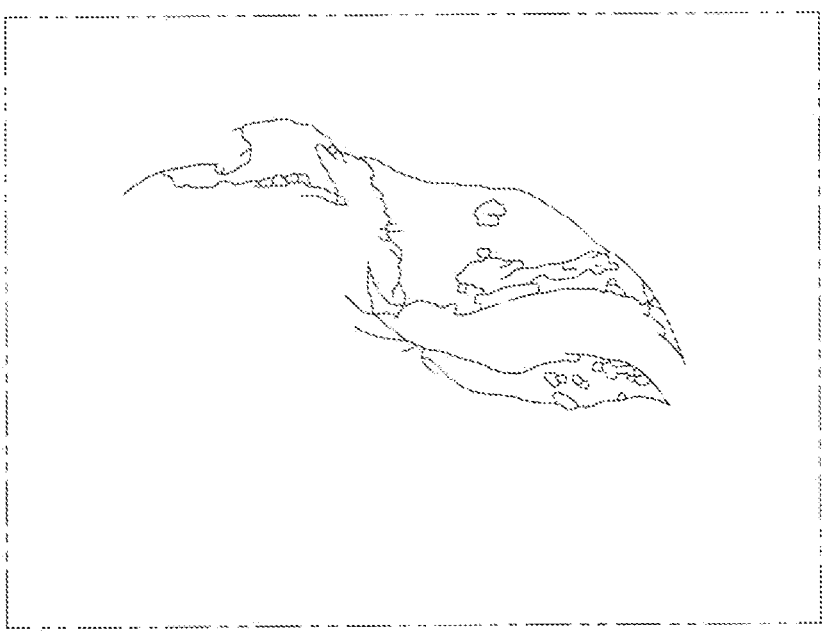

FIG. 4 is a block diagram illustrating a DVS event compensation circuit according to example embodiments, FIG. 5 is a diagram for describing an operation of a luminance converter included in the DVS event compensation circuit of FIG. 4, and FIGS. 6A and 6B are diagrams for describing an operation of a filter included in the DVS event compensation circuit of FIG. 4.

Referring to FIG. 4, a DVS event compensation circuit 500 may include a luminance converter 510, a filter 520, a scaler 530, an event generator 540 and an event combiner 550.

The luminance converter 510 may generate luminance data YDT based on image data IMDT. As illustrated in FIG. 5, first image data IMDT1 may correspond to a pattern of repeated unit pixel group including two green pixels G, one red pixel R and one blue pixel B, and second image data IMDT2 may correspond to a pattern of repeated unit pixel group including one green pixel G, one red pixel R, one blue pixel B, and one white pixel W. The pattern of arranging the image pixels is not limited to those of FIG. 5.

For example, the first image data IMDT1 corresponding to the four pixel values of the four image pixels may be represented by one pixel value Y of the luminance data YDT as Equation 1 (Eq. 1).

$$Y = Gr \cdot R + 2 \cdot Gg \cdot G + Gb \cdot B \qquad (1)$$

In Equation 1, variables Gr, Gg, and Gb indicate gains of the color pixels. Variables R, G, and B indicate the pixel values of the color pixels.

In the same way, the second image data IMDT2 corresponding to the four pixel values of the four image pixels may be represented by one pixel value Y of the luminance data YDT as Equation 2 (Eq. 2).

$$Y = Gr \cdot R + 2 \cdot Gg \cdot G + Gb \cdot B + Gw \cdot W \qquad (2)$$

In Equation 2, variables Gr, Gg, Gb, and Gw indicate gains of color pixels. Variables R, G, B, and W indicate the pixel values of the color pixels.

The filter 520 may generate edge data EGDT based on the luminance data YDT. The filter 520 may be implemented with an edge detector such as a high-pass filter (HPF) configured to extract edge information from the luminance data YDT. The edge detector may generate the edge data EGDT indicate edges of the image in the luminance data YDT using the schemes such as Canny edge detection. FIG. 6A illustrates an example image of the image data and FIG. 6B illustrates an edge image of the edge data corresponding to a portion RT of the image of FIG. 6A.

The scaler 530 may spatially synchronize the edge data EGDT and the event data EVDT such that pixels of the edge data EGDT and pixels of the event data EVDT correspond to each other. For example, the scaler 530 may adjust the resolution of the edge data EGDT such that the edge data EGDT' has the same resolution as that of the event data EVDT.

In some example embodiments, the event data EVDT of a first resolution may be generated using the DVS pixels arranged by the first resolution, and the image data IMDT of a second resolution may be generated using the image pixels arranged by the second resolution higher than the first resolution. In this case, the luminance converter 510 and the filter 520 may generate the original edge data EGDT of the second resolution indicating the edge information of the image based on the image data IMDT of the second resolution and the scaler 530 may convert the original edge data EGDT of the second resolution to the edge data EGDT' of the first resolution. If the image data IMDT and the event data EVDT have the same resolution, the scaler 530 may be omitted.

The event generator 540 may generate omitted events OMEV based on the edge data EGDT'. Example embodiments of generating the omitted events OMEV will be described below with reference to FIGS. 7 and 8.

The event combiner 550 may generate compensated event data EVDT' by combining the events included in the original event data EVDT and the omitted events OMEV generated by the scaler 530.

Figure 7:
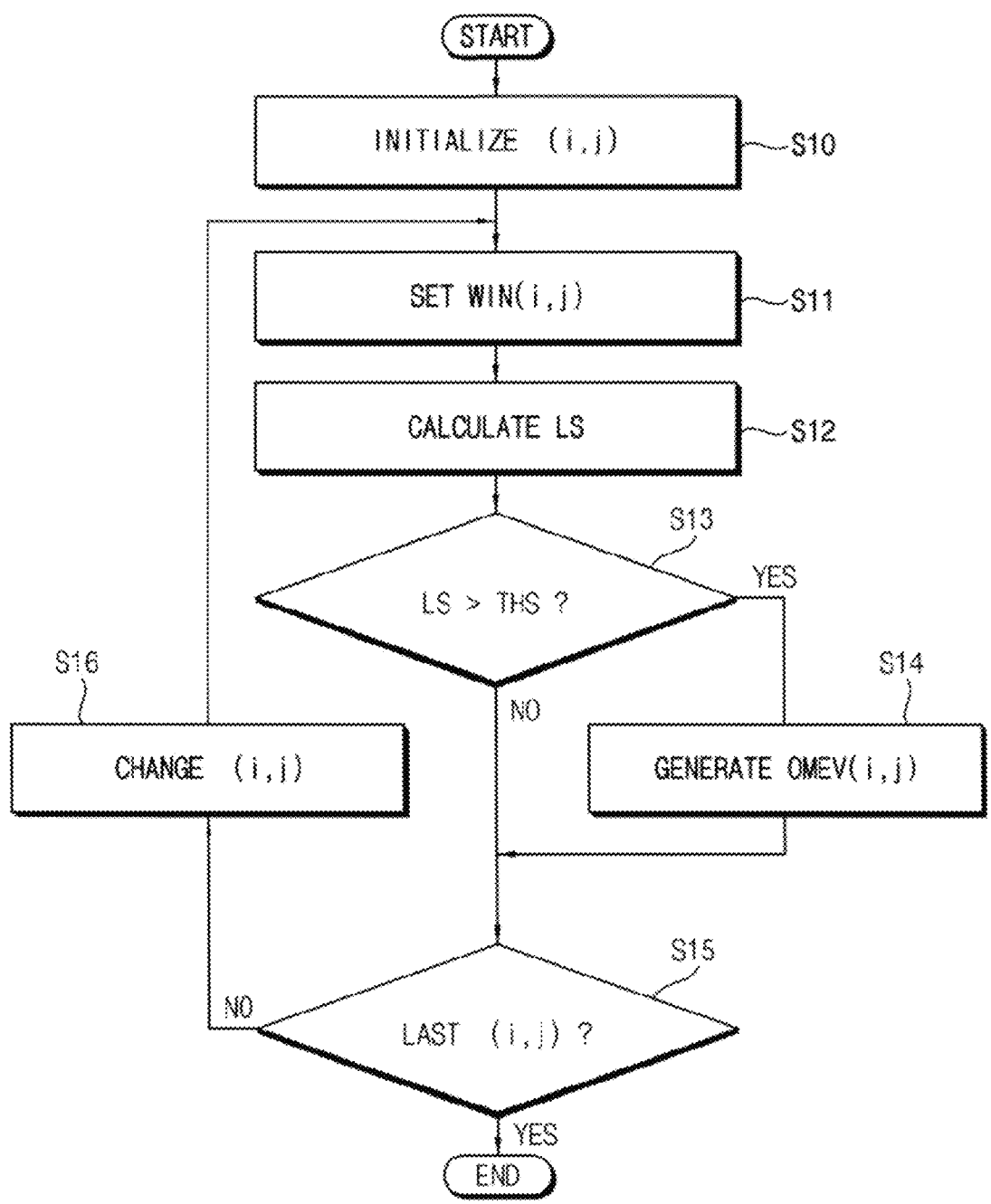
FIG. 7 is a flow chart illustrating a method of generating omitted events according to example embodiments.

By enhancing the event data EVDT with omitted events OMEV, the DVS event compensation circuit 500 may enable a FIG. 7 is a flow chart illustrating a method of generating omitted events according to example embodiments.

Referring to FIGS. 6 and 7, the event generator 540 may initialize an address or a position of a target pixel (S10). The pixel address may be represented by (i, j) where i is a row number of a pixel and j is a column number of the pixel. The target pixel may indicate a DVS pixel corresponding to a possible omitted event after the edge data EGDT' and the event data EVDT are spatially synchronized so that pixels of the edge data EGDT' and pixels of the event data EVDT may correspond to each other (e.g., with the same resolution).

The event generator 540 may set a window WIN(i, j) centered on the target pixel (S11). The window WIN(i, j) may include the target pixel and neighboring pixels of the target pixel. For example, the window WIN(i, j) may have a 3*3 size, as illustrated in FIG. 8, but the size may be 5*5, 7*7, and the like.

The event generator 540 may calculate at least one line sum value LS by summing multiplied values of the edge data EGDT' and the event data EVDT by units of pixels in one direction, with respect to the target pixel and the neighboring pixels in the window WIN(i,j) (S12).

The event generator 540 may compare the line sum value LS with a reference value THS (S13) and generate the omitted event based on a result of the comparison. For example, when the line sum value LS is greater than the reference value THS (S13:YES), the event generator 540 may generate the omitted event OMEV(i,j) corresponding to the target pixel (S14).

When the line sum value LS is less than the reference value THS (S13:NO), the event generator 540 may not generate the omitted event OMEV(i,j) corresponding to the target pixel. The event generator 540 may repeat the above processes (S11, S12, S13, S14) with changing the address (i,j) of the target pixel (S16) until the processes are completed for the last pixel among the DVS pixels.

As such, generating the line sum value (S12), comparing the line sum value with the reference value (S13) and generating the omitted event based on the result of the comparison (S14) may be repeated when the target pixel is sequentially changed (S16) from among to the DVS pixels.

Thus, according to example embodiments DVS pixels sense event data EVDT representing changes in an image; image pixels sense image data IMDT of the image; a filter 520 may generate edge data EGDT representing edge information of the image based on the image data; a scaler 530 may generate modified edge data EGDT', where each pixel of the modified edge data EGDT' corresponds to a pixel of the event data; and an event generator 540 may obtain a line sum value by summing values of the edge data multiplied by values of the event data in one pixel direction relative to a target pixel, compare the line sum value with a reference value, and generate an omitted event based on the comparison.

Figure 8:
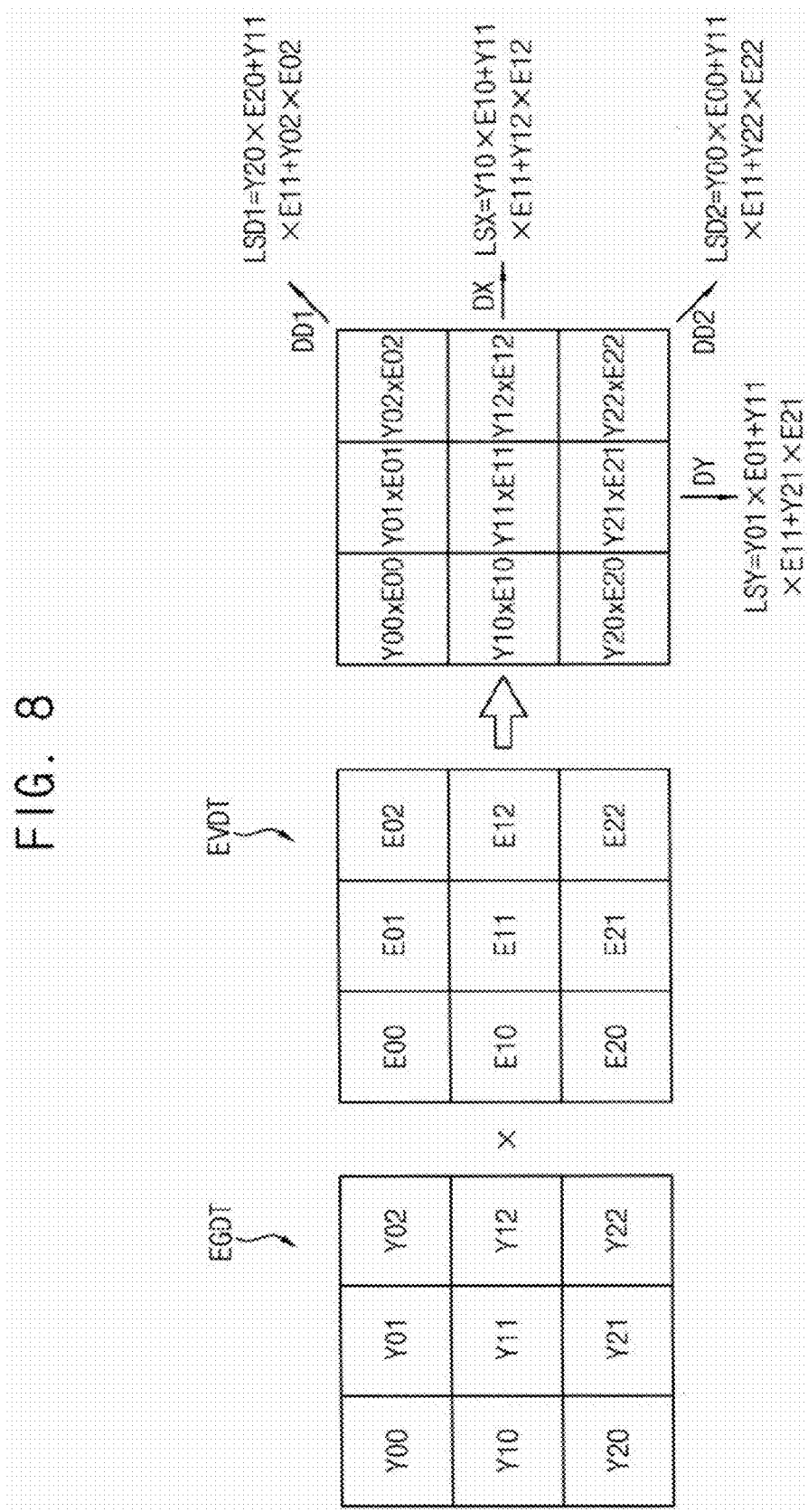
FIG. 8 is a diagram illustrating an example embodiment of the method of FIG. 7.

FIG. 8 is a diagram illustrating an example embodiment of the method of FIG. 7.

FIG. 8 illustrates an example of the window of a 3*3 size for convenience of illustration and description, and the size of the window may be changed variously. In FIG. 8, the address of the target pixel is (1,1) as an example.

Referring to FIG. 8, with respect to the target pixel and the neighboring pixels in the window, a horizontal line sum value LSX, a vertical line sum value LSY, a first diagonal line sum value LSD1 and a second diagonal line sum value LSD2 may be calculated by summing the multiplied values of the edge data EGDT and the event data EVDT by units of pixels in each direction.

The horizontal line sum value LSX may be obtained by summing the multiplied values Y10×E10, Y11×E11 and Y12×E12 of the edge data EGDT and the event data EVDT by units of pixels in a horizontal direction DX, with respect to the target pixel (1,1) and neighboring pixels (1,0) and (1,2) that neighbor the target pixel (1,1) in the horizontal direction DX.

The vertical line sum value LSY may be obtained by summing the multiplied values Y01×E01, Y11×E11 and Y21×E21 of the edge data EGDT and the event data EVDT by units of pixels in a vertical direction DY, with respect to the target pixel (1,1) and neighboring pixels (0,1) and (2,1) that neighbor the target pixel (1,1) in the vertical direction DY.

The first diagonal sum value LSD1 may be obtained by summing the multiplied values Y20×E20, Y11×E11 and Y02×E02 of the edge data EGDT and the event data EVDT by units of pixels in a first diagonal direction DD1, with respect to the target pixel (1,1) and neighboring pixels (2,0) and (0,2) that neighbor the target pixel (1,1) in the first diagonal direction DD1.

The second diagonal sum value LSD2 may be obtained by summing the multiplied values Y00×E00, Y11×E11 and Y22×E22 of the edge data EGDT and the event data EVDT by units of pixels in a second diagonal direction DD2, with respect to the target pixel (1,1) and neighboring pixels (0,0) and (2,2) that neighbor the target pixel (1,1) in the second diagonal direction DD2.

In this case, a comparison between the line sum value LS with the reference value THS (S13) in FIG. 7 may include comparing each of the horizontal line sum value LSX, the vertical line sum value LSY, the first diagonal line sum value LSD1 and the second diagonal line sum value LSD2 with a first reference value TH1.

In some example embodiments, the event generator 540 may generate the omitted event OMEV(1,1) corresponding to the target pixel (1,1) when at least one of the horizontal line sum value LSX, the vertical line sum value LSY, the first diagonal line sum value LSD1 and the second diagonal line sum value LSD2 is greater than the first reference value TH1.

In some example embodiments, the event generator 540 may generate the omitted event OMEV(1,1) corresponding to the target pixel (1,1) when a count value is greater than a second reference value TH2 where the count value indicates the number of values from the horizontal line sum value LSX, the vertical line sum value LSY, the first diagonal line sum value LSD1 and the second diagonal line sum value LSD2 that are greater than the first reference value TH1.

According to example embodiments, the event generator 540 may determine whether the omitted event corresponding to the target pixel is an on-event or an off-event based on a first number of on-events and a second number of off-events corresponding to the neighboring pixels of the target pixel. For example, the event generator 540 may determine the omitted event as the on-event when the first number is greater than the second number. The event generator 540 may also determine the omitted event as the off-event when the second number is greater than the first number. For another example, the event generator 540 may determine the omitted event as the on-event when the first number is greater than a reference number and determine the omitted event as the off-event when the second number is greater than the reference number.

Figure 9:
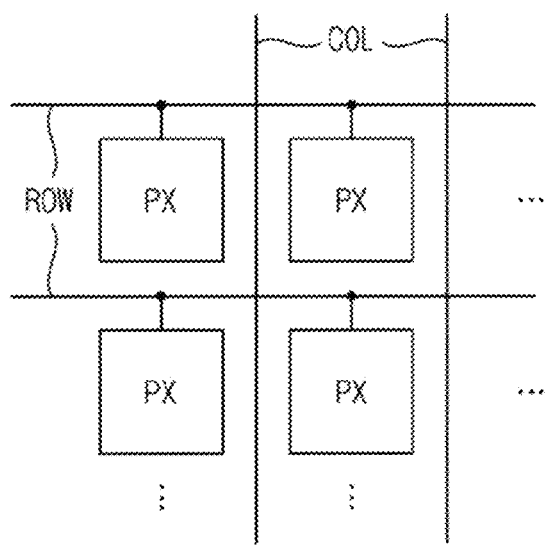
FIG. 9 is a diagram illustrating a pixel array included in an image sensor according to example embodiments.

FIG. 9 is a diagram illustrating a pixel array included in an image sensor according to example embodiments.

Referring to FIG. 9, a pixel array may include a plurality of pixels PX arranged in a matrix form of a plurality of rows and a plurality of columns. The pixel array may include the image pixels, the DVS pixels or both image pixels and the DVS pixels. Each pixel PX may be connected to a corresponding column line COL and a corresponding row line ROW. FIG. 9 illustrates an example that each pixel PX is connected to one column line COL and one row line ROW. According to the configuration of the pixel, each pixel may be connected two or more column lines and/or two or more row lines.

FIGS. 10A through 10D are circuit diagrams illustrating example embodiments of an image pixel included in a pixel array.

Figure 10A:
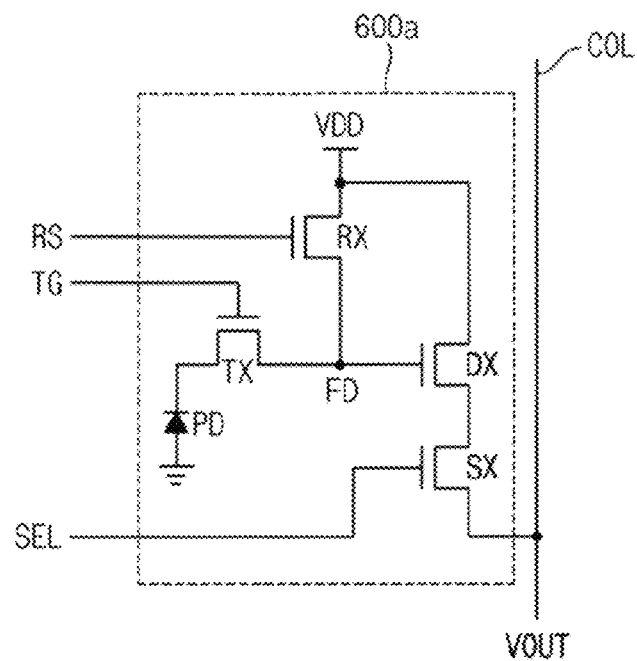
FIGS. 10A through 10D are circuit diagrams illustrating example embodiments of an image pixels included in a pixel array.

Referring to FIG. 10A, a unit pixel 600a may include a photo-sensitive element and a readout circuit. An example of a photo-sensitive element may be a photodiode PD. Examples of a readout circuit may be a transfer transistor TX, a reset transistor RX, a drive transistor DX and a selection transistor SX.

For example, the photodiode PD may include an n-type region in a p-type substrate such that the n-type region and the p-type substrate form a p-n conjunction diode. The photodiode PD receives the incident light and generates a photo-charge based on the incident light. In some example embodiments, the unit pixel 600a may include a phototransistor, a photogate, a pinned photodiode, etc. instead of, or in addition to, the photodiode PD.

The photo-charge generated in the photodiode PD may be transferred to a floating diffusion node FD through the transfer transistor TX. The transfer transistor TX may be turned on in response to a transfer control signal TG The drive transistor DX functions as a source follower amplifier that amplifies a signal corresponding to the charge on the floating diffusion node FD. The selection transistor SX may transfer the amplified signal VOUT to a column line COL in response to a selection signal SEL. The floating diffusion node FD may be reset by the reset transistor RX. For example, the reset transistor RX may discharge the floating diffusion node FD in response to a reset signal RS for correlated double sampling (CDS).

Figure 10B:
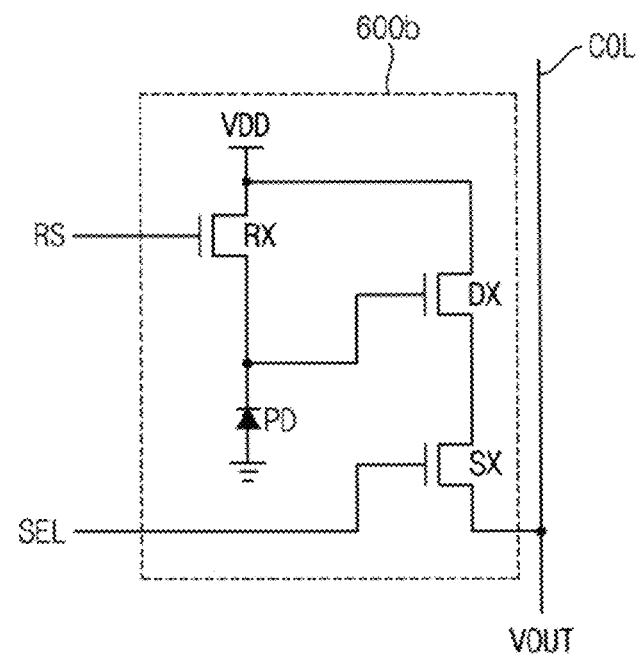
Figure 10C:
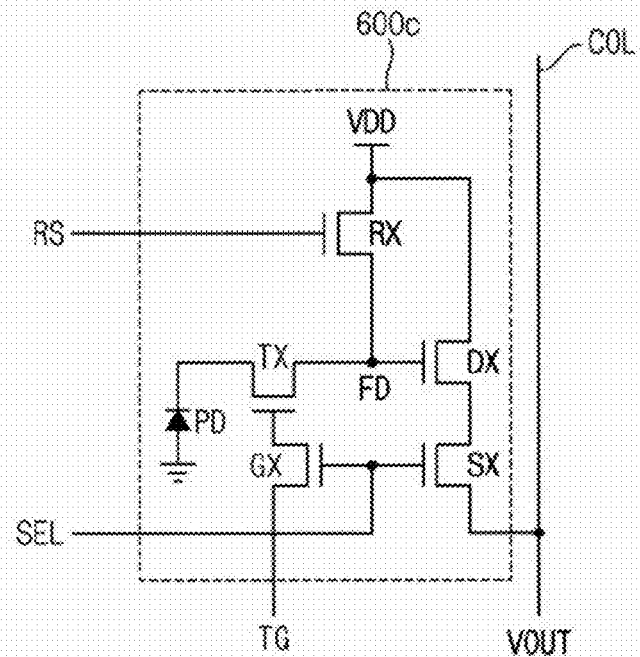
Figure 10D:
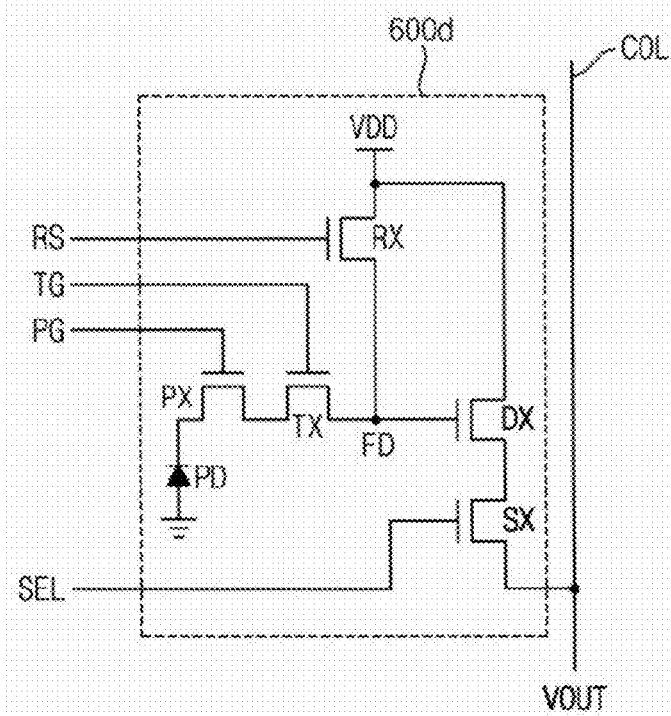

FIG. 10A illustrates the unit pixel 600a of the four-transistor configuration including the four transistors TX, RX, DX and SX. The configuration of the unit pixel may be variously changed as illustrated in FIGS. 10B, 10C, and 10D. Power may be supplied via voltage supply terminal VDD and ground.

Referring to FIG. 10B, a unit pixel 600b may have the three-transistor configuration including a photo-sensitive element such as a photodiode PD, and a readout circuit including a reset transistor RX, a drive transistor DX and a selection transistor SX. Compared with the unit pixel 600a of FIG. 10A, the transfer transistor TX is omitted in the unit pixel 600b of FIG. 10B.

Referring to FIG. 10C, a unit pixel 600c may have the five-transistor configuration including a photo-sensitive element such as a photodiode PD, and a readout circuit including a transfer transistor TX, a gate transistor GX, a reset transistor RX, a drive transistor DX and a selection transistor SX. The gate transistor GX may selectively apply the transfer control signal TG to the transfer transistor TX in response to the selection signal SEL. Compared with the unit pixel 600a of FIG. 10A, the gate transistor GX is further included in the unit pixel 600c of FIG. 10C.

Referring to FIG. 10D, a unit pixel 600d may have the five-transistor configuration including a photo-sensitive element such as a photodiode PD, and a readout circuit including a phototransistor PX, a transfer transistor TX, a reset transistor RX, a drive transistor DX and a selection transistor SX. The phototransistor PX may be turned on or off in response to a photogate signal PG The unit pixel 600d may enabled when the phototransistor PX is turned on and disabled when the phototransistor PX is turned off. Compared with the unit pixel 600a of FIG. 10A, the phototransistor PX is further included in the unit pixel 600d of FIG. 10D. In addition, the unit pixel may have six-transistor configuration further including the gate transistor GX of FIG. 10C (or a bias transistor) in addition to the configuration of FIG. 10D.

The phototransistor PX may be turned on and off in response to a photogate signal PG While the phototransistor PX is turned on, the photodiode PD may detect the incident light to generate the photo charges. In contrast, while the phototransistor PX is turned off, the photodiode PD may not detect the incident light.

Figure 11:
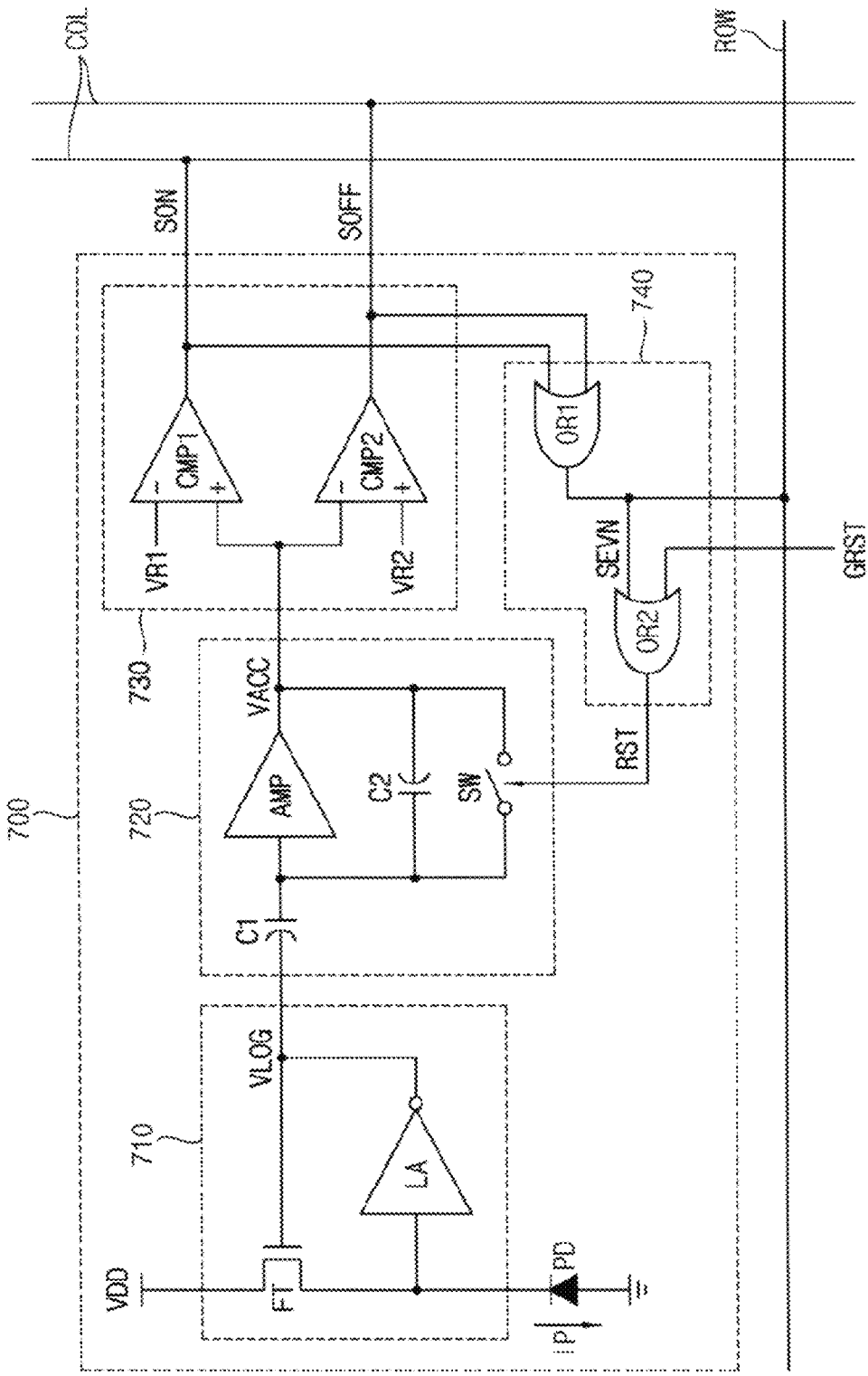
FIG. 11 is a circuit diagram illustrating an example embodiment of a DVS pixel included in a pixel array.

FIG. 11 is a circuit diagram illustrating an example embodiment of a DVS pixel included in a pixel array.

Referring to FIG. 11, a DVS pixel 700 may include a photodiode PD, a current-to-voltage (I/V) converter 710, an amplifier circuit 720, a comparator circuit 730 and a digital logic 740.

The photodiode PD is an example of a photoelectric conversion element. The photodiode PD may be a phototransistor, a photogate, a pinned photodiode (PPD), or a combination thereof. The photodiode PD may generate a IP according to the intensity of incident light.

The I/V converter 710 may include a converting transistor FT and an inversion amplifier LA. The inversion amplifier LA may convert and amplify the input voltage to output a first voltage VLOG As a result, the I/V converter 710 may sense the photocurrent IP flowing through photodiode PD to output the first current VLOG corresponding to the photocurrent IP.

The amplifier circuit 720 may include a first capacitor C1, a second capacitor C2, an amplifier AMP, and a reset switch SW. The reset switch SW may be switched in response to a reset signal RST provided form the digital logic 740. When the reset signal RST is activated, the reset switch SW may be turned on to discharge the second capacitor C2 and a second voltage VACC may be reset to a specific voltage level. When the reset signal RST is deactivated, the reset switch SW is turned off, and the input voltage of the amplifier circuit 720 may be maintained at a constant level due to a feedback path by the second capacitor C2. The input terminal of the amplifier AMP may be a virtual ground. Accordingly, the amplifier circuit AMP may output the second voltage VACC based on the first voltage VLOG such that the second voltage VACC may be related with a variance in the first voltage VLOG over time.

The comparator circuit 730 may include a first comparator CMP1 and a second comparator CMP2. The first comparator CMP1 may compare the second voltage VACC with a first reference voltage VR1 to generate an on-event signal SON. The second comparator CMP2 may compare the second voltage VACC with a second reference voltage VR2 to generate an off-event signal SOFF.

For example, the first comparator CMP1 may activate the on-event signal SON when the second voltage VACC is lower than the first reference voltage VR1. The second comparator CMP2 may activate the off-event signal SOFF when the second voltage VACC is higher than the second reference voltage VR2. As such, the comparator circuit 730 may activate the on-event signal SON and the off-event signal SOFF when the variance of the incident light is greater than the predetermined level. The on-event signal SON may be at a high level when the shading of the DVS pixel 700 is brighter than a predetermined level, and the off-event signal SOFF may be at a high level when the shading of the DVS pixel 700 is darker than a predetermined level. The on-event and off-event signals SON and SOFF may be transmitted to the digital logic 740, and to the column AER 156 in FIG. 3 through the column lines COL.

The digital logic 740 may generate an on-off event signal SEVN based on the on-event and off-event signals SON and SOFF output from the comparator circuit 730. For example, the digital logic 740 may include an OR gate OR1 to receive the on-event and off-event signals SON and SOFF and to generate the on-off event signal SEVN when one of the on-event and off-event signals SON and SOFF is activated at the high level. The one-off event signal SEVN may be transmitted to the row AER 158 through the row line ROW. In addition, the digital logic 740 may include another OR gate OR2 that activates the reset signal RST when one of the on-off event signal SEVN and a global reset signal GRST.

Figure 12:
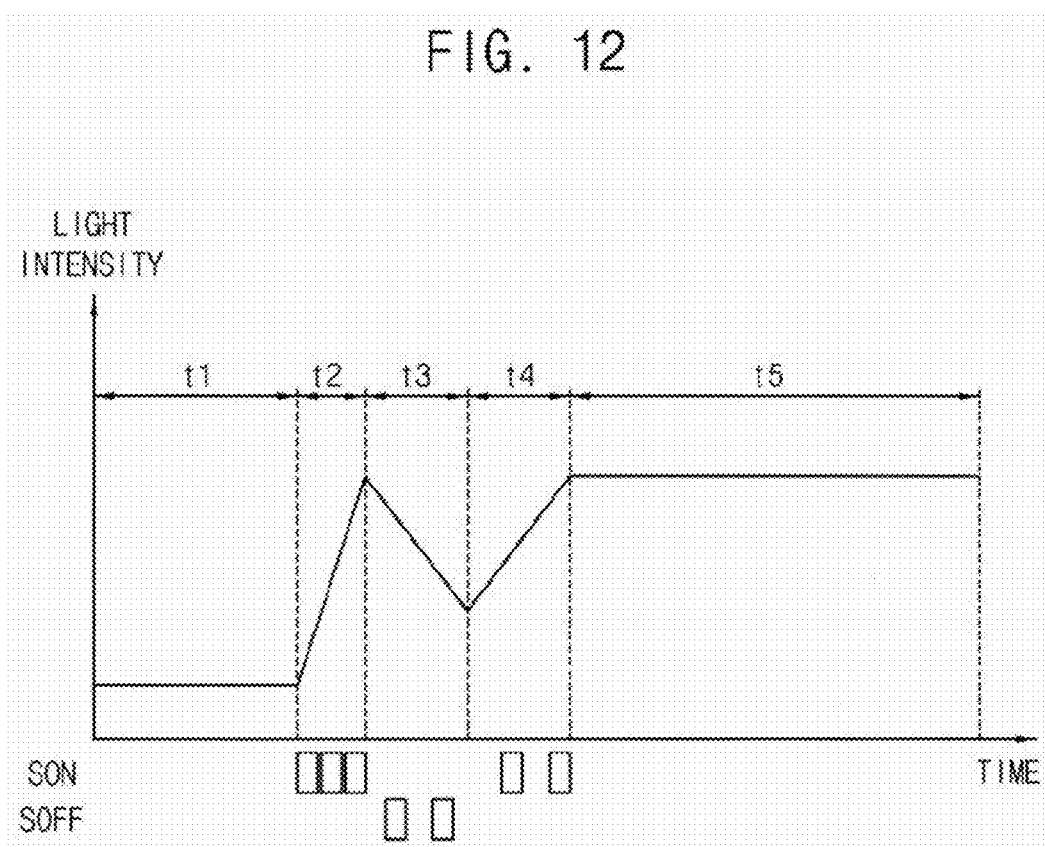
FIG. 12 is a diagram illustrating an operation of the DVS pixel of FIG. 11.

FIG. 12 is a diagram illustrating an operation of the DVS pixel of FIG. 11.

In FIG. 12, the vertical axis represents an intensity of the incident light, and the horizontal axis represents time.

Referring to FIG. 12, during a first period t1, the intensity of the incident light is kept constant, and thus the on-event signal SON and the off-event signal SOFF may not be activated.

During a second period t2, the intensity of the incident light increases with a first slope and the on-event signal SON may be activated three times.

During a third period t3, the intensity of the incident light decreases with a second slope smaller than the first slope and the off-event signal SOFF may be activated two times.

During a fourth period t2, the intensity of the incident light increases with the second slope and the on-event signal SON may be activated two times.

The intensity of the incident light is kept constant during a fifth period t5. Therefore, the first voltage VLOG and the second voltage VACC may be kept constant such that the on-event signal SON and the off-event signal SOFF may not be activated.

Figure 13:
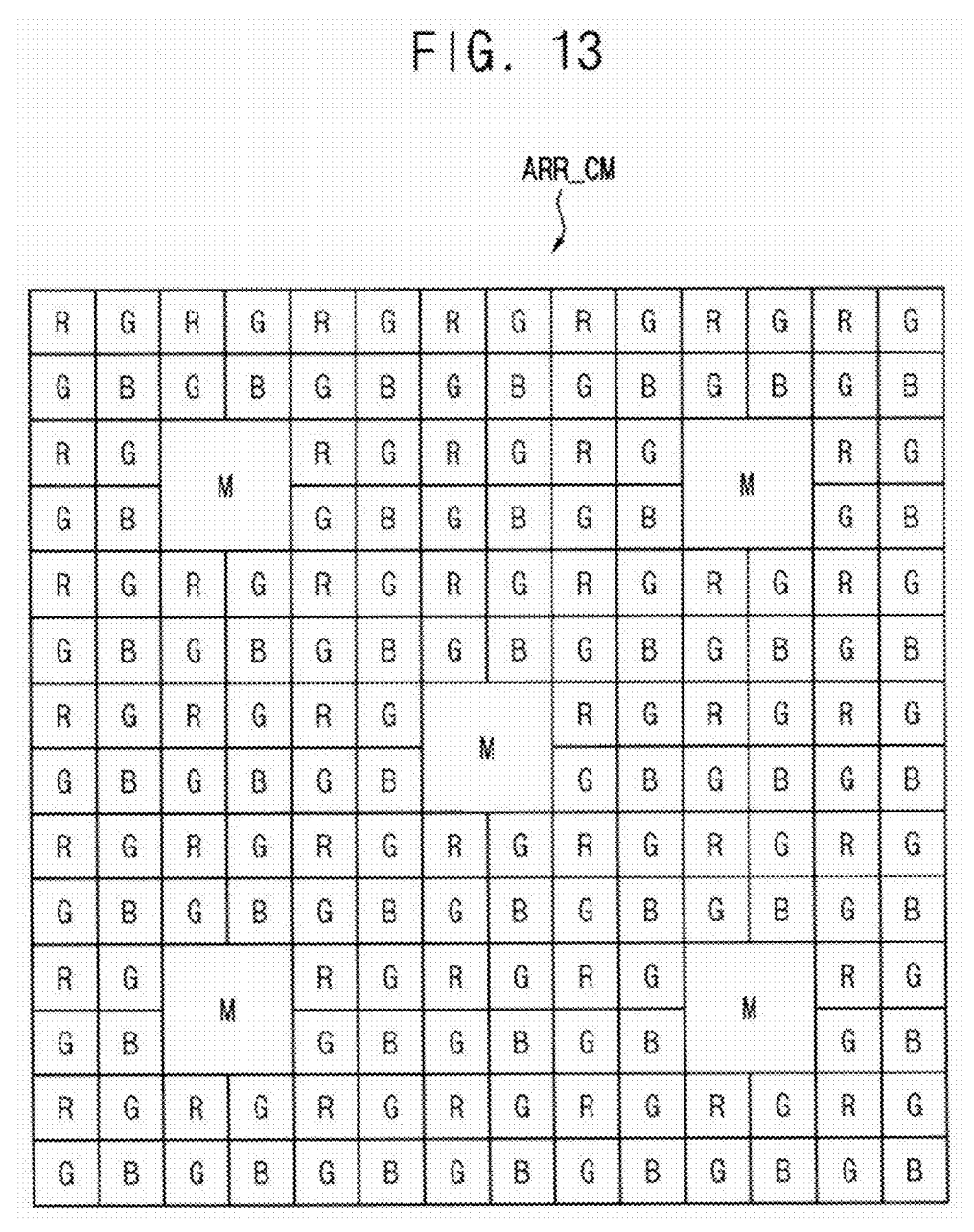

FIG. 13 is a diagram illustrating an example embodiment of a layout of a pixel array included in an image sensor according to example embodiments.

Referring to FIG. 13, a pixel array ARR_CM may include DVS pixels M arranged with image pixels including red pixels R, green pixels B, and blue pixels B. FIG. 13 illustrates that one DVS pixel M is four times the size of one image pixel, and example embodiments are limited thereto.

In addition, the arrangement of the DVS pixels M and the color pixels R, G and B may be changed variously.

Figure 14:
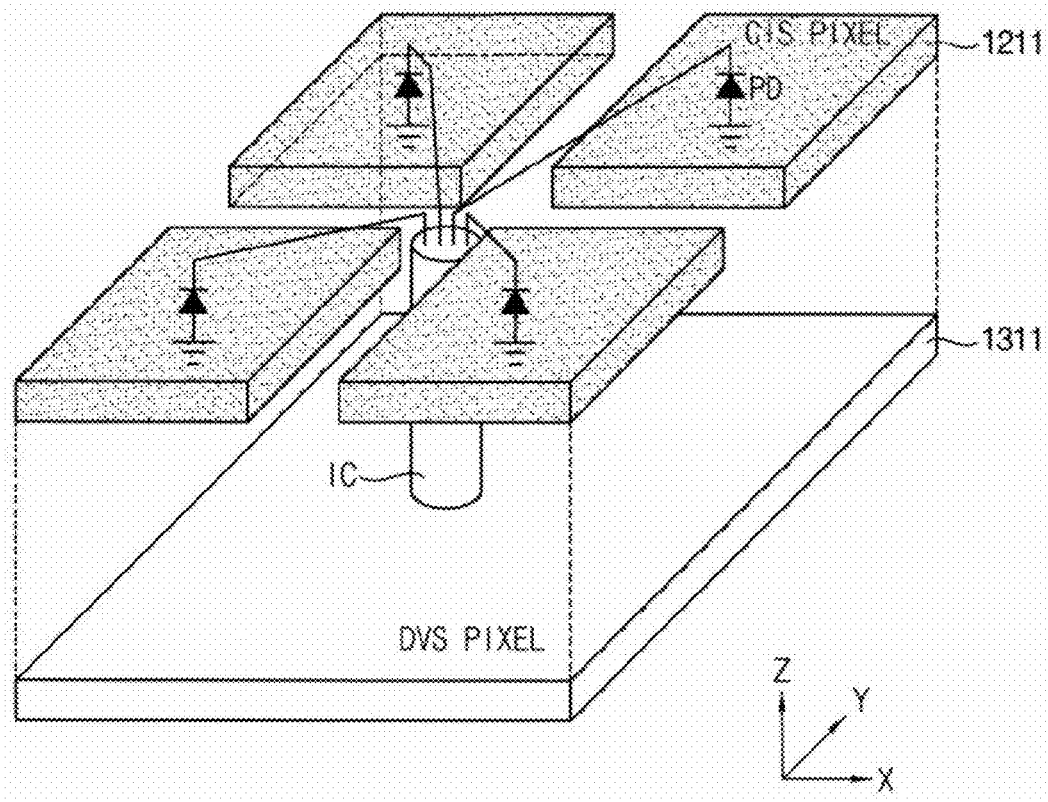
FIG. 14 is a diagram illustrating a pixel array having a stack structure applicable to the layout of FIG. 13.

FIG. 14 is a diagram illustrating a pixel array with a stack structure applicable to the layout of FIG. 13.

Referring to FIG. 14, a pixel array may have a stack structure including a first semiconductor die 1211 and a second semiconductor die 1311. The image pixels (for example, CIS pixels) including photosensitive elements (for example, photodiodes PD) may be formed in the first semiconductor die 1211 and the DVS pixels may be formed in the second semiconductor die 1311. For example, the photodiodes PD formed in the first semiconductor die 1211 may be electrically connected to the DVS pixels formed in the second semiconductor die 1311 through conduction paths IC, and thus the image pixels and the DVS pixels may share the photodiodes PD.

Figure 15:
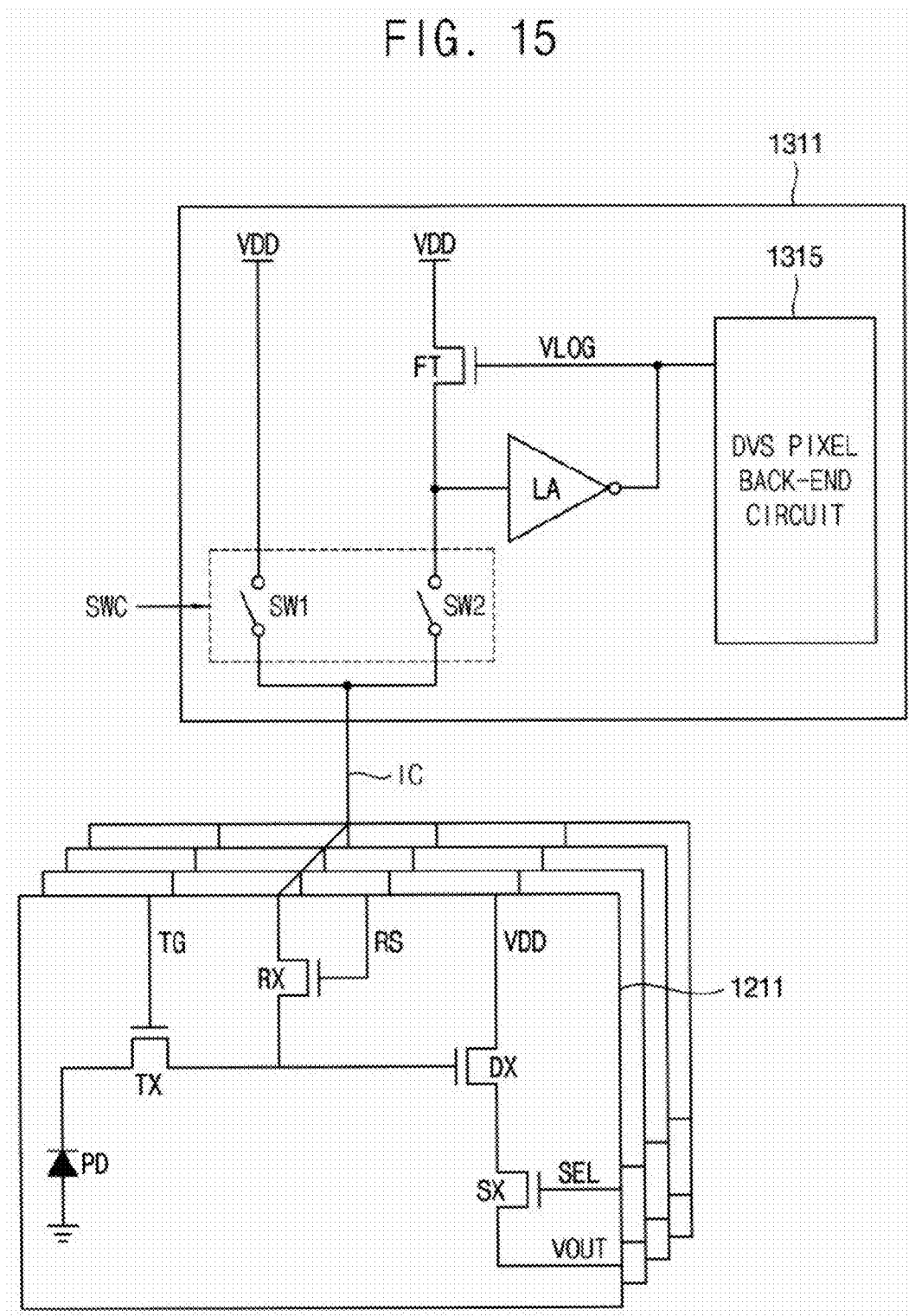
FIG. 15 is a diagram illustrating an example embodiment of image pixels implemented in the pixel array having the stack structure of FIG. 14.
Figure 16:
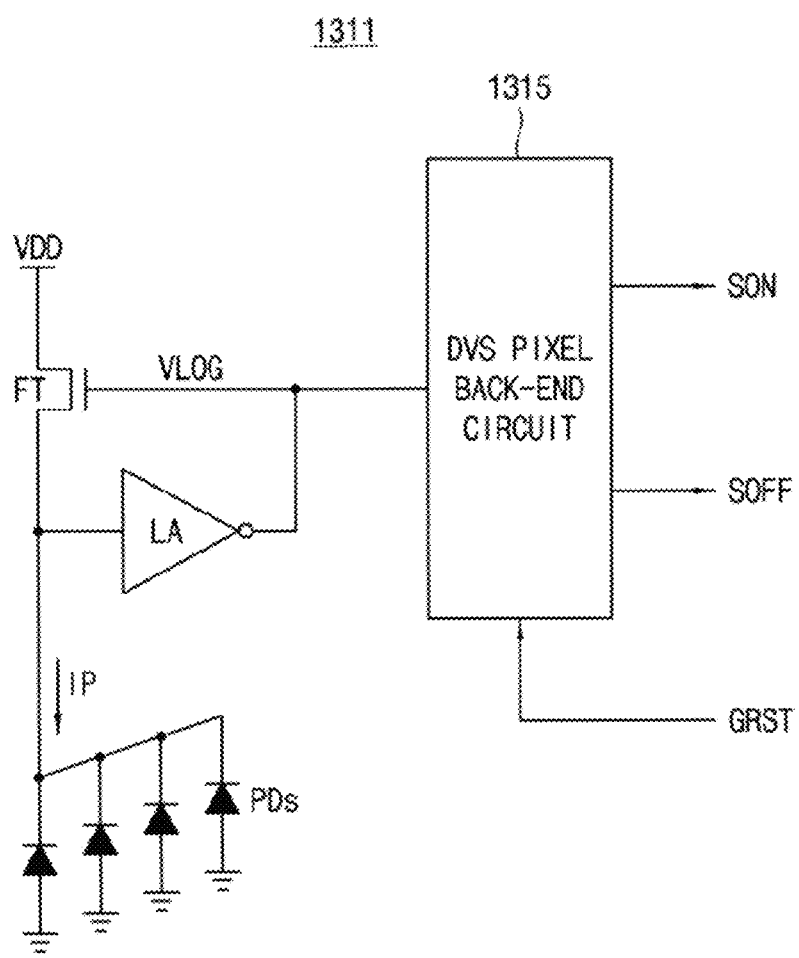
FIG. 16 is a diagram illustrating an example embodiment of a DVS pixel implemented in the pixel array having the stack structure of FIG. 14.

FIG. 15 is a diagram illustrating an example embodiment of image pixels implemented in the pixel array with the stack structure of FIG. 14, and FIG. 16 is a diagram illustrating an example embodiment of a DVS pixel implemented in the pixel array with the stack structure of FIG. 14.

The image pixels formed in the first semiconductor die 1211 are the same as described with reference to FIGS. 10A through 10D. The DVS pixels formed in the second semiconductor die 1311 are the same as described with reference to FIG. 11. Repeated descriptions are omitted. The DVS pixel back-end circuit 1315 in FIG. 15 may include the amplifier circuit 720, the comparator circuit 730, and the digital logic 740 as described with reference to FIG. 11.

The configuration in FIG. 15 may operate as the image pixels or the DVS pixel by first and second switches SW1 and SW2 that are switched based on a switch control signal SWC.

When the first switch SW1 is turned on and the second switch SW2 is turned off, the voltage corresponding to the photo charged generated by the photodiodes PD may be applied to the gate electrode of the drive transistor DX. Thus, the four pixels in the first semiconductor die 1211 may operate as the four image pixels.

When the first switch SW1 is turned off and the second switch SW2 is turned on, the voltage corresponding to the photo charged generated by the photodiodes PD may be applied to the gate electrode of the converting transistor FT. Thus, the one pixel in the second semiconductor die 1311 may operate as the one DVS pixel.

FIG. 16 illustrates one DVS pixel that uses the photodiodes PD formed in the first semiconductor die 1211 and the other elements are formed in the second semiconductor die 1311.

Figure 17:
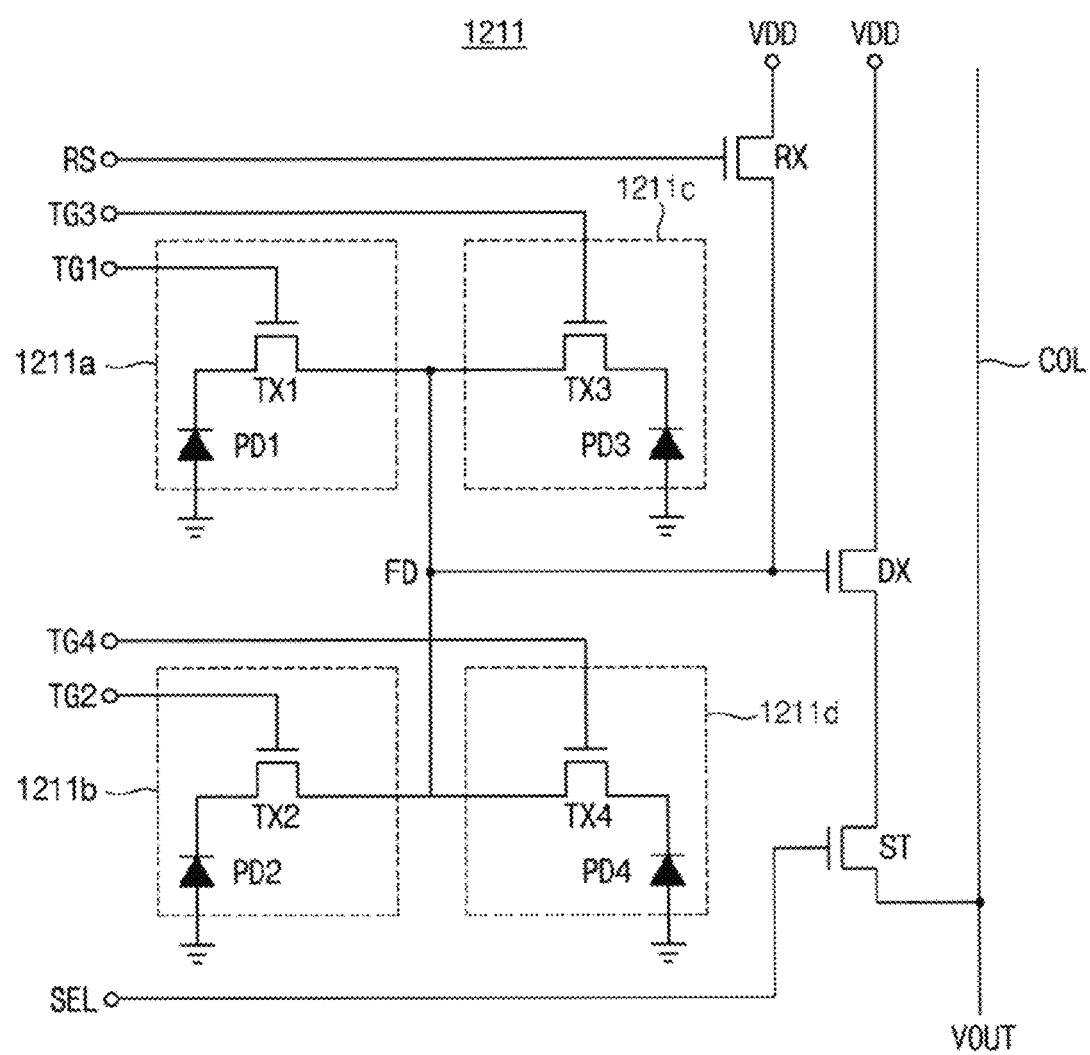
FIG. 17 is diagram illustrating an example embodiment of image pixels implemented in the pixel array having the stack structure of FIG. 14.
Figure 18:
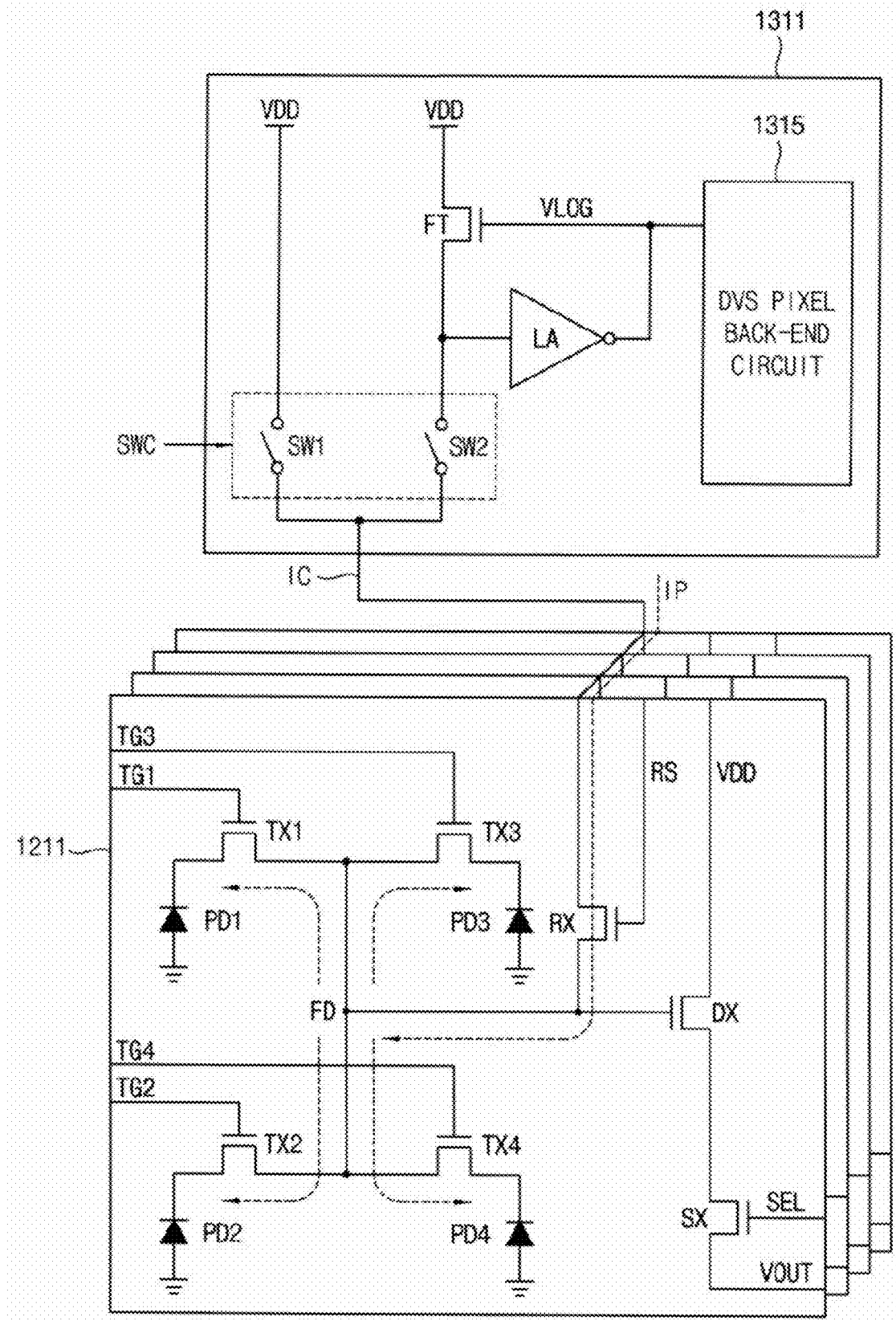
FIG. 18 is a diagram illustrating an example embodiment of a pixel array having the stack structure of FIG. 14.

FIG. 17 is a diagram illustrating an example embodiment of image pixels implemented in the pixel array with the stack structure of FIG. 14, and FIG. 18 is a diagram illustrating an example embodiment of a pixel array with the stack structure of FIG. 14.

Referring to FIG. 17, first through fourth image pixels 1211a through 1211d may include first through fourth transfer transistors TX1 through TX4 operating in response to first through transfer control signals TG1 through TG4, respectively. The first through fourth transfer transistors TX1 through TX4 may be commonly connected to one floating diffusion node FD and the first through fourth image pixels 1211a through 1211d may share the readout elements RX, DX and SX. The first through fourth transfer control signals TG1 through TG4 may be sequentially activated by a time-division scheme. The data corresponding to the photo charged in the first through fourth photodiodes PD1 through PD4 may be read out sequentially.

The configuration of FIG. 18 is substantially the same as described with reference to FIGS. 14, 15 and 16 except that the configuration of the image pixels of FIG. 17 is applied, and the repeated descriptions are omitted.

FIG. 19 is a block diagram illustrating an image sensor according to example embodiments. FIG. 19 illustrates a first pixel array ARR_C including image pixels and a second pixel array ARR_M including DVS pixels, which are separated physically. Referring to FIG. 19, an image sensor may include the first pixel array ARR_C in which a plurality of image pixels are arranged and the second pixel array ARR_M in which a plurality of DVS pixels are arranged.

Figure 20:
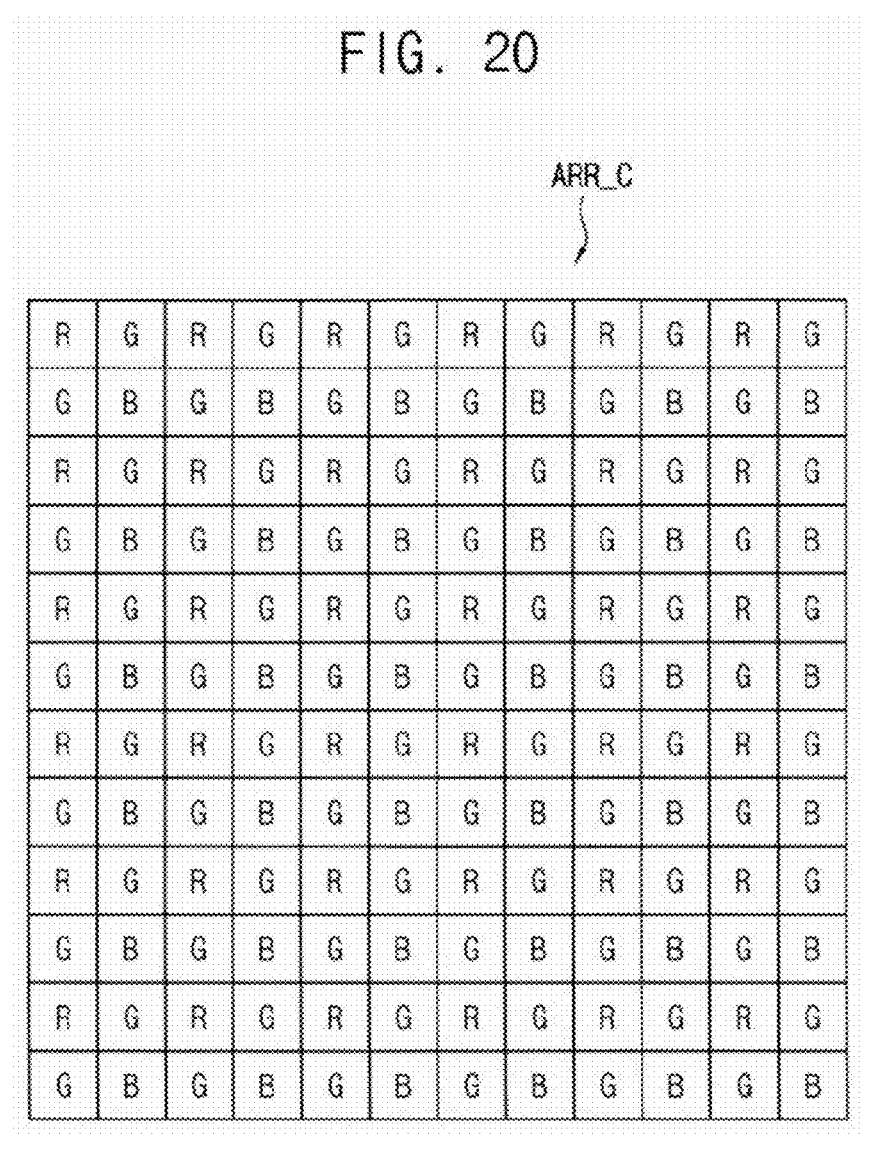
Figure 21:
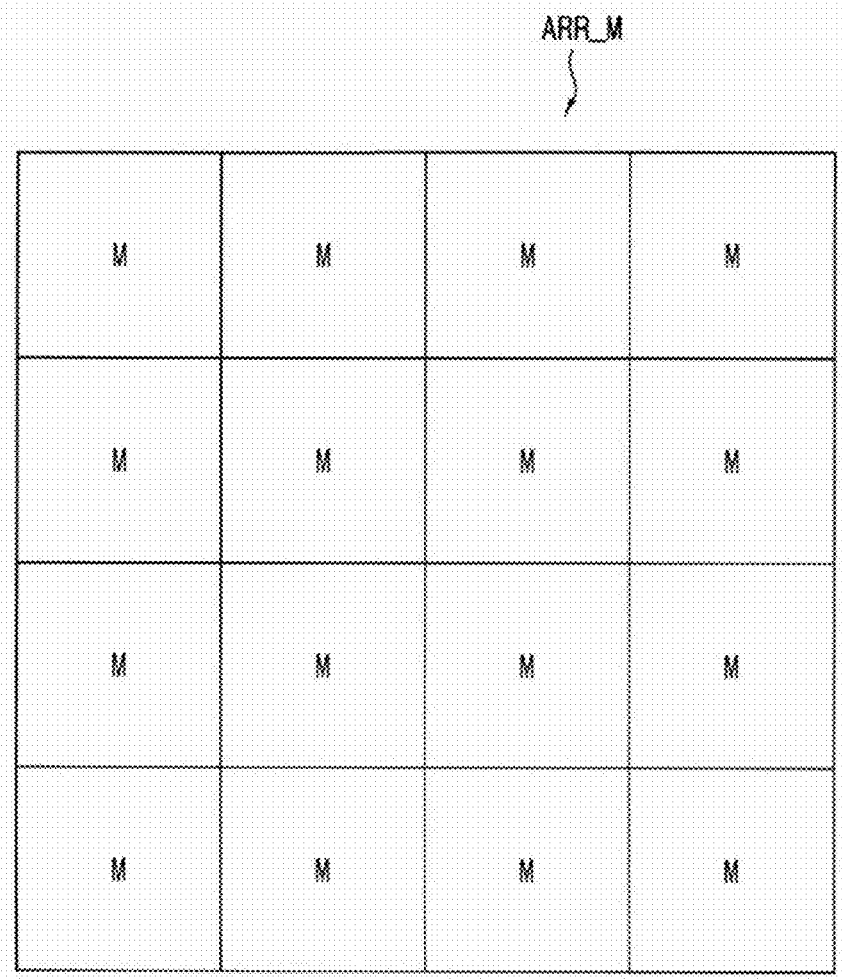

FIGS. 20 and 21 are diagrams illustrating example embodiments of a layout of a pixel array included in an image sensor according to example embodiments. FIG. 20 illustrates an example layout of the first pixel array ARR_C. FIG. 21 illustrates an example layout of the second pixel array ARR_M.

The row driver RDEC and a readout circuit ROC, as described with reference to FIG. 3, may be disposed adjacent to the first pixel array ARR_C to provide the image data IMDT. In addition, the column AER AER_C and the row AER AER_R as described with reference to FIG. 3 may be disposed adjacent to the second pixel array ARR_M to provide the event data EVDT.

As such, the image sensor and the DVS distinct from the image sensor may operate independently by implementing the elements for the image data IMDA and the elements for the event data EVDT, respectively.

Figure 22:
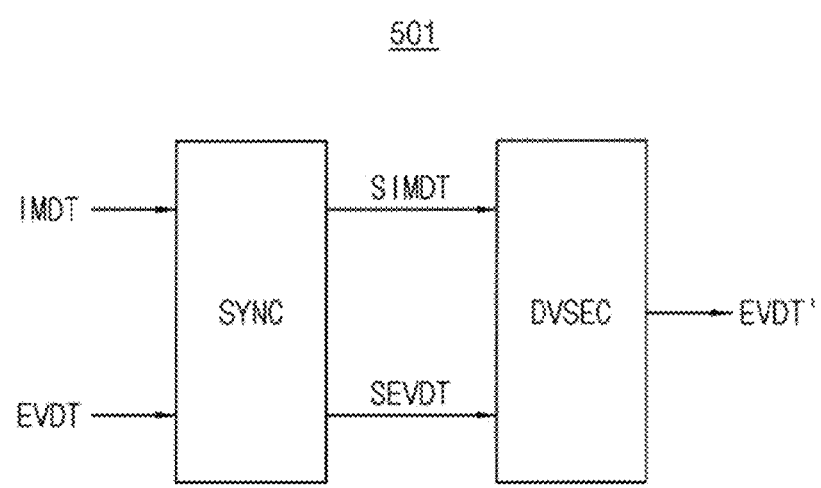
FIG. 22 is a block diagram illustrating an example embodiment of a DVS event compensation device included in an image sensor according to example embodiments.
Figure 23:
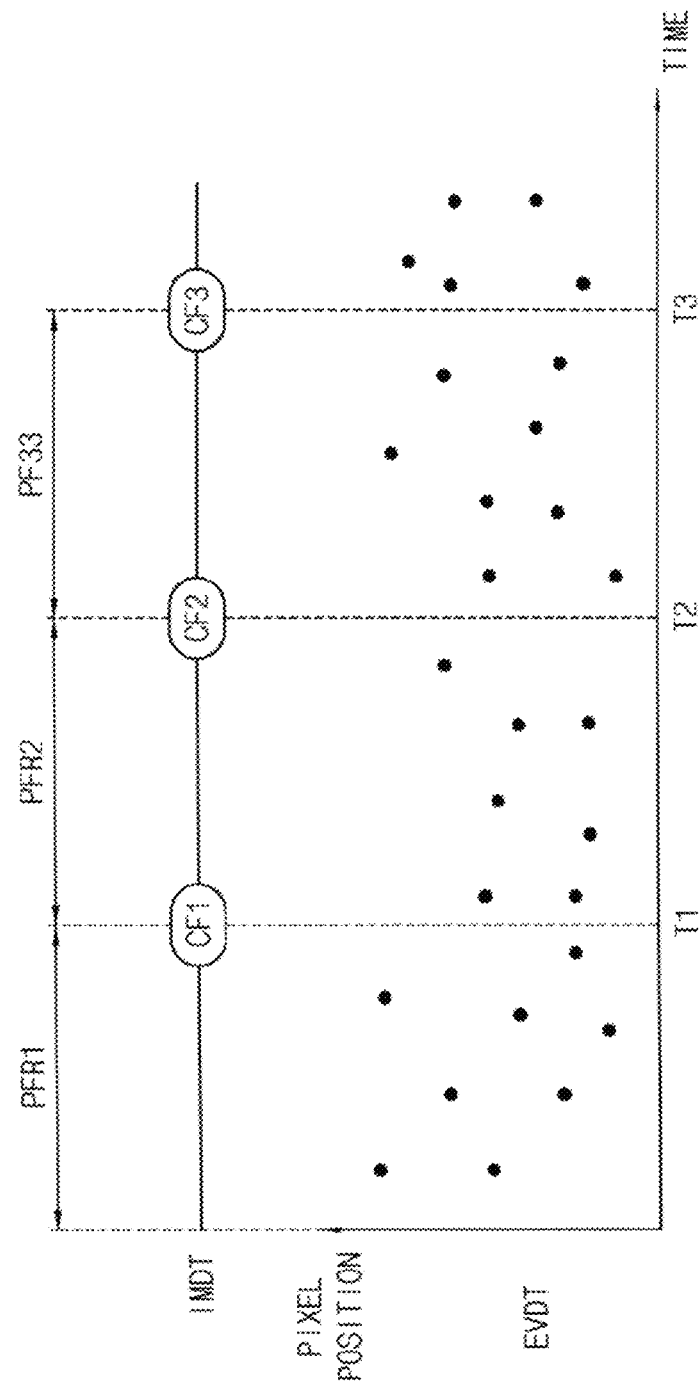
FIG. 23 is a diagram for describing an operation of a synchronizer included in the DVS event compensation circuit of FIG. 22.

FIG. 22 is a block diagram illustrating an example embodiment of a DVS event compensation device included in an image sensor according to example embodiments. FIG. 23 is a diagram for describing an operation of a synchronizer included in the DVS event compensation circuit of FIG. 22.

Referring to FIG. 22, a DVS event compensation device 501 may include a synchronizer SYNC and a DVS event compensation circuit DVSEC. The DVS event compensation circuit DVSEC in FIG. 22 is substantially the same as the DVS event compensation circuit 500 in FIG. 4, and the repeated descriptions are omitted.

The synchronizer SYNC may temporally synchronize original image data IMDT and original event data EVDT to provide synchronized image data SIMDT and synchronized event data SEVDT. As illustrated in FIG. 23, the original image data IMDT is provided as frame image data CF1, CF2 and CF3 at time point T1, T2 and T3 corresponding to a specific frame rate, whereas the original event data EVDT includes the events generated irregularly. In FIG. 23, events are represented by solid circles, the vertical axis indicates position where the event occurs, and the horizontal axis indicates time.

For example, the synchronizer SYNC may synchronize the events during the first frame period PFR1 with the first frame image data CF1 and synchronize the events during the second frame period PFR2 with the second frame image data CF2. The synchronizer SYNC may also synchronize the events during the third frame period PFR3 with the third frame image data CF3. The synchronization method of the synchronizer SYNC is not limited thereto and may be determined variously.

Figure 24:
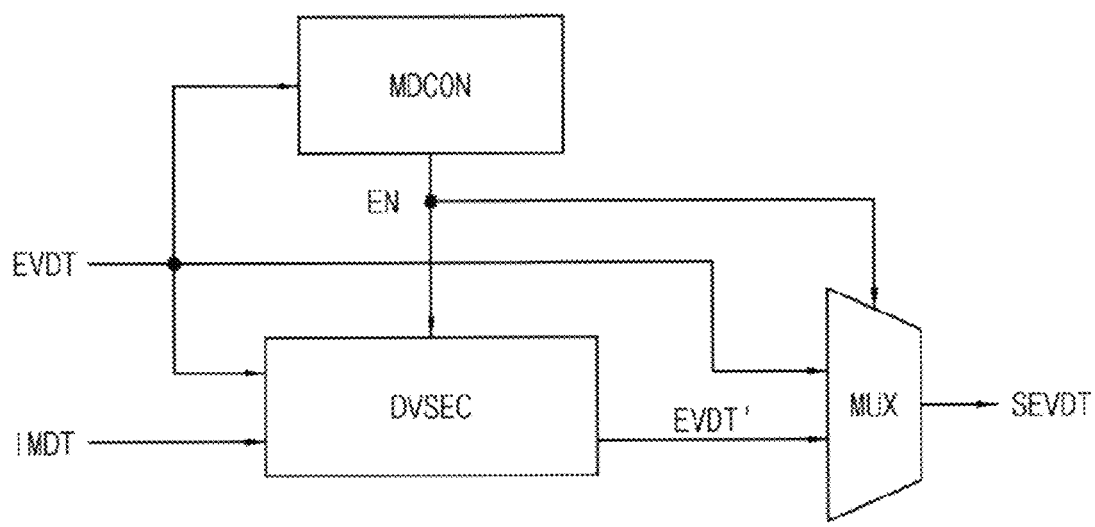
FIG. 24 is a block diagram illustrating an example embodiment of a DVS event compensation device included in an image sensor according to example embodiments.
Figure 25:
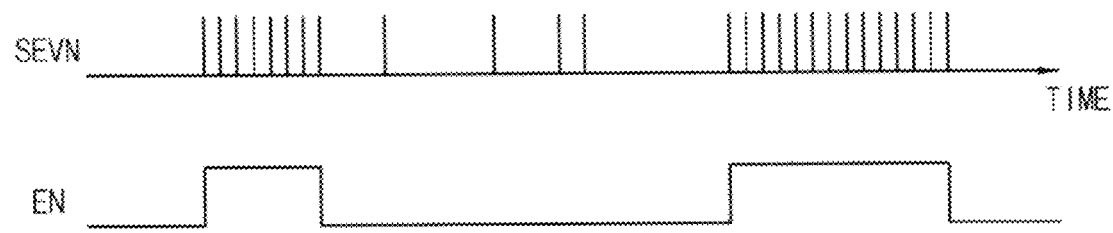

FIG. 24 is a block diagram illustrating an example embodiment of a DVS event compensation device included in an image sensor according to example embodiments, and FIGS. 25 and 26 are diagrams for describing an operation of a mode controller included in the DVS event compensation circuit of FIG. 24.

Referring to FIG. 24, a DVS event compensation device 502 may include a mode controller MDCON and a DVS event compensation circuit DVSEC. The DVS event compensation circuit DVSEC in FIG. 24 is substantially the same as the DVS event compensation circuit 500 in FIG. 4, and the repeated descriptions are omitted.

The mode controller MDCON may determine whether to perform the DVS event compensation operation as described above and generate an enable signal EN. When the enable signal EN is activated, the DVS event compensation circuit DVSEC may perform the DVS event compensation operation in response to the activated enable signal EN. Additionally, a multiplexer MUX may provide compensated event data EVDT' as selected event data SEVDT in response to the activated enable signal EN. In contrast, when the enable signal EN is deactivated, the DVS event compensation circuit DVSEC may not perform the DVS event compensation operation in response to the deactivated enable signal EN. Additionally, the multiplexer MUX may provide the original event data EVDT as the selected event data SEVDT in response to the deactivated enable signal EN.

FIG. 25 illustrates an example of an on-off event signal SEVN with irregular events. In some example embodiments, the mode controller MDCON may determine whether to correct the DVS events based on an occurrence rate of events. As illustrated in FIG. 25, the mode controller MDCON may activate the enable signal EN when the occurrence rate of the events is higher than a reference value and deactivate the enable signal EN when the occurrence rate of the events is lower than the reference value. According to example embodiments, the mode controller MDCON may generate the enable signal EN based on the on-off event signal SEVN or based on the event data EVDT.

Referring to FIG. 26, the event data corresponding to one frame may be divided into a plurality of subframes SBFR11~SBFR34. In this case, the mode controller MDCON may determine whether to correct the DVS events with respect to each of the plurality of subframes SBFR11~SBFR34, as described above.

In general, the captured frame image includes fixed background and a moving object with relatively smaller size than the background. The above-described event compensation operation may be performed for the subframes including the moving object. By omitting the event compensation operation with respect to the subframes that do not include the moving object, the processing time and the power consumption may be reduced and performance of the image sensor according to example embodiments and the system including the image sensor may be enhanced.

Figure 27:
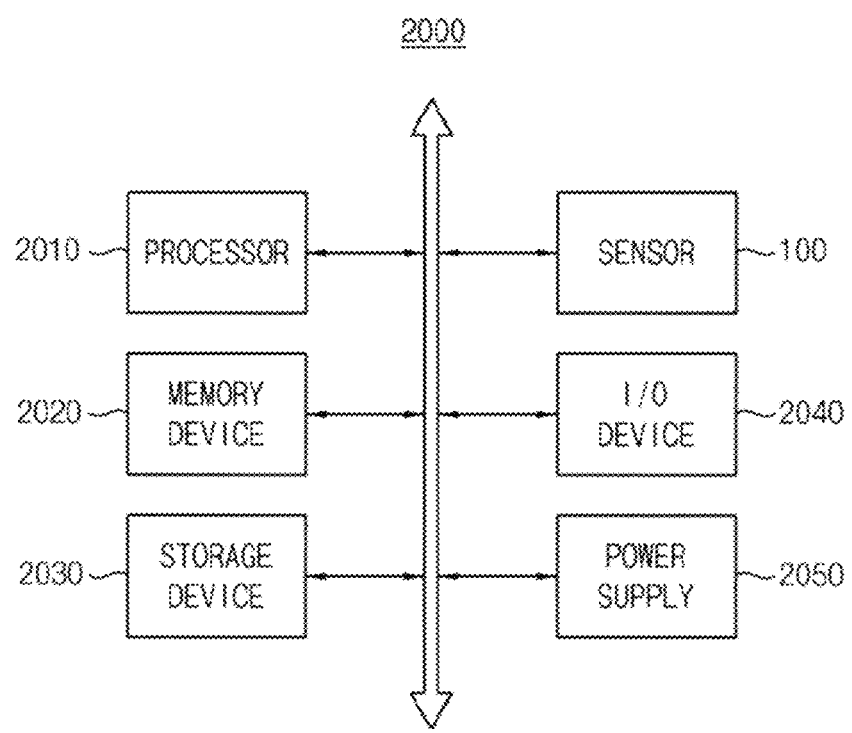
FIG. 27 is a block diagram illustrating a computing system including an image sensor according to example embodiments.

FIG. 27 is a block diagram illustrating a computing system including an image sensor according to example embodiments.

Referring to FIG. 27, a computing system 2000 may include a processor 2010, a memory device 2020, a storage device 2030, an input/output device 2040, a power supply 2050 and an image sensor 100. Although not illustrated in FIG. 27, the computing system 2000 may further include ports that communicate with a video card, a sound card, a memory card, a universal serial bus (USB) device, and/or other electronic devices.

The processor 2010 may perform various calculations or tasks. According to some embodiments, the processor 2010 may be a microprocessor or a central processing unit (CPU). The processor 2010 may communicate with the memory device 2020, the storage device 2030 and the input/output device 2040 via an address bus, a control bus, and/or a data bus. In some example embodiments, the processor 2010 may be coupled to an extended bus, such as a peripheral component interconnection (PCI) bus. The memory device 2020 may store data for operating the computing system 2000. For example, the memory device 2020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 2030 may include a solid-state drive (SSD), a hard disk drive (HDD), a compact-disc read-only memory (CD-ROM), etc. The input/output device 2040 may include an input device (e.g., a keyboard, a keypad, a mouse, etc.) and an output device (e.g., a printer, a display device, etc.). The power supply 2050 supplies operation voltages for the computing system 2000.

The image sensor 100 may communicate with the processor 2010 via buses or other communication links. The image sensor 100 may include a DVS event compensation circuit according to example embodiments as described above. The DVS event compensation circuit may generate edge data representing edge information of an image based on image data and generate omitted events of event data based on the edge data.

As such, the method of correcting the events of the DVS and the image sensor according to example embodiments may enhance accuracy of the event data and performance of machine vision devices and systems operating based on the event data. Correcting the events of the DVS may be performed by supplementing the omitted events of the event data provided from the DVS, using the edge information of a subject of an image.

The inventive concept may be applied to any electronic devices and systems using a dynamic vision sensor. For example, the inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A method of correcting dynamic vision sensor (DVS) events, comprising:
   generating, using DVS pixels, event data including events representing motion information of an object included in an image;
   generating, using image pixels, image data capturing the image;
   generating edge data representing edge information of the image based on the image data; and
   generating omitted events of the event data based on the edge data.

2. The method of claim 1, wherein each pixel of the edge data corresponds to a pixel of the event data.

3. The method of claim 1, wherein generating the image data includes:

generating color pixel values using color pixels corresponding to different colors, and
wherein generating the edge data includes:
generating luminance data including luminance values based on the color pixel values of the image data; and
wherein the edge data is generated based on the luminance data.

4. The method of claim 1, further comprising:
spatially synchronizing the edge data and the event data such that each pixel of the edge data corresponds to a pixel of the event data.

5. The method of claim 1, wherein generating the event data includes:
generating, using the DVS pixels arranged by a first resolution, the event data of the first resolution,
wherein generating the image data includes:
generating, using the image pixels arranged by a second resolution higher than the first resolution, the image data of the second resolution, and
wherein generating the edge data includes:
generating original edge data of the second resolution indicating the edge information of the image based on the image data of the second resolution; and
converting the original edge data of the second resolution to the edge data of the first resolution.

6. The method of claim 1, further comprising:
temporally synchronizing the image data and the event data.

7. The method of claim 1, wherein generating the omitted events includes:
obtaining a line sum value by summing multiplied values of the edge data and the event data by units of pixels in one direction, with respect to a target pixel and neighboring pixels of the target pixel among the DVS pixels;
comparing the line sum value with a reference value; and
generating the omitted event based on a result of the comparison.

8. The method of claim 7, wherein obtaining the line sum value includes:
obtaining a horizontal line sum value by summing the multiplied values of the edge data and the event data by units of pixels in a horizontal direction, with respect to the target pixel and neighboring pixels that neighbor the target pixel in the horizontal direction;
obtaining a vertical line sum value by summing the multiplied values of the edge data and the event data by units of pixels in a vertical direction, with respect to the target pixel and neighboring pixels that neighbor the target pixel in the vertical direction;
obtaining a first diagonal line sum value by summing the multiplied values of the edge data and the event data by units of pixels in a first diagonal direction, with respect to the target pixel and neighboring pixels that neighbor the target pixel in the first diagonal direction; and
obtaining a second diagonal line sum value by summing the multiplied values of the edge data and the event data by units of pixels in a second diagonal direction, with respect to the target pixel and neighboring pixels that neighbor the target pixel in the second diagonal direction.

9. The method of claim 8, wherein comparing the line sum value with the reference value includes:
comparing each of the horizontal line sum value, the vertical line sum value, the first diagonal line sum value and the second diagonal line sum value with a first reference value.

10. The method of claim 9, wherein generating the omitted event based on the result of the comparison includes:
generating the omitted event corresponding to the target pixel when at least one of the horizontal line sum value, the vertical line sum value, the first diagonal line sum value and the second diagonal line sum value is greater than the first reference value.

11. The method of claim 9, wherein generating the omitted event based on the result of the comparison includes:
generating the omitted event corresponding to the target pixel when a count value is greater than a second reference value, where the count value indicates a number of values from the horizontal line sum value, the vertical line sum value, the first diagonal line sum value and the second diagonal line sum value that are greater than the first reference value.

12. The method of claim 7, wherein generating the omitted event based on the result of the comparison includes:
determining whether the omitted event corresponding to the target pixel is an on-event or an off-event based on a first number of on-events and a second number of off-events corresponding to the neighboring pixels of the target pixel.

13. The method of claim 12, wherein determining whether the omitted event corresponding to the target pixel is the on-event or the off-event includes:
determining the omitted event is the on-event when the first number of on-events is greater than the second number of off-events; and
determining the omitted event is the off-event when the second number of off-events is greater than the first number of on-events.

14. The method of claim 12, wherein determining whether the omitted event corresponding to the target pixel is the on-event or the off-event includes:
determining the omitted event is the on-event when the first number is greater than a reference number; and
determining the omitted event is the off-event when the second number is greater than the reference number.

15. The method of claim 7, wherein generating the line sum value, comparing the line sum value with the reference value, and generating the omitted event based on the result of the comparison are repeated when the target pixel is sequentially changed.

16. The method of claim 1, further comprising:
determining whether to correct DVS events based on an occurrence rate of events.

17. The method of claim 1, further comprising:
dividing the event data into a plurality of sub frames; and
determining whether to correct DVS events with respect to each of the plurality of sub frames.

18. An image sensor comprising:
dynamic vision sensor (DVS) pixels configured to generate event data representing motion information of an object included in an image;
image pixels configured to generate image data capturing the image; and
a DVS event compensation circuit configured to generate edge data representing edge information of the image based on the image data, and to generate omitted events of the event data based on the edge data.

19. The image sensor of claim 18, wherein each pixel of the edge data corresponds to a pixel of the event data.

20. A method of correcting dynamic vision sensor (DVS) events, comprising:

sensing event data representing changes in an image;
sensing image data of the image;
generating edge data representing edge information of the image based on the image data, wherein each pixel of the edge data corresponds to a pixel of the event data;
obtaining a line sum value by summing values of the edge data multiplied by values of the event data in one pixel direction relative to a target pixel;
comparing the line sum value with a reference value; and
generating an omitted event based on the comparison.

* * * * *